US012520852B2

(12) United States Patent
Ray et al.

(10) Patent No.: US 12,520,852 B2
(45) Date of Patent: Jan. 13, 2026

(54) POULTRY PROCESSING APPARATUS AND METHOD

(71) Applicant: Bettcher Industries, Inc., Birmingham, OH (US)

(72) Inventors: David Bobby Ray, Gainesville, GA (US); Thomas W. Reins, Jr., Dawsonville, GA (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 18/651,404

(22) Filed: Apr. 30, 2024

(65) Prior Publication Data

US 2025/0331527 A1 Oct. 30, 2025

(51) Int. Cl.
*A22C 21/00* (2006.01)

(52) U.S. Cl.
CPC ...... *A22C 21/0053* (2013.01); *A22C 21/0007* (2013.01); *A22C 21/0023* (2013.01)

(58) Field of Classification Search
CPC ............ A22C 21/0053; A22C 21/0007; A22C 21/0023
USPC ........................................................... 452/177
See application file for complete search history.

(56) References Cited

U.S. PATENT DOCUMENTS 4,586,215 A * 5/1986 Meyn ................ A22C 21/0023 452/165
4,935,990 A * 6/1990 Linnenbank ....... A22C 21/0023 452/167
5,368,520 A 11/1994 Koch et al.
5,405,289 A * 4/1995 Schumann ......... A22C 21/0053 452/131
5,569,069 A * 10/1996 Horst ................. A22C 21/0023 452/169
6,322,438 B1 * 11/2001 Barendregt ........ A22C 21/0023 452/155
6,857,191 B2 2/2005 Whited
7,341,508 B2 * 3/2008 Rigo ........................ G07D 1/00 453/18
7,422,517 B2 9/2008 Criscione, II et al.
7,789,739 B2 9/2010 Criscione, II et al.
8,517,805 B1 8/2013 Ray et al.
8,641,487 B1 2/2014 Ray et al.
8,702,480 B1 4/2014 Ray et al.
(Continued)

*Primary Examiner* — Richard T Price, Jr.
(74) *Attorney, Agent, or Firm* — George L. Pinchak; Watts Law LLC

(57) ABSTRACT

A poultry processing apparatus for processing a poultry carcass with attached wings. The apparatus includes a shackle conveyor including a set of shackles. Adjacent shackles receive respective wings of a poultry carcass in a wing-receiving opening of the shackle to support the poultry carcass for movement along a shackle path of travel. A first cutting module is positioned adjacent a section of the shackle conveyor, the first cutting module including a cutting head having spaced apart first and second cutting members and a translation mechanism moving the cutting head in two directions: a) moving the cutting head between a retracted position and an engaged position in a direction transverse to the shackle path of travel; and b) moving the cutting head in a direction along the shackle path of travel in synchronization with the conveyor over an engagement distance wherein the first and second cutting members engage the poultry carcass.

26 Claims, 26 Drawing Sheets

(56) References Cited

U.S. PATENT DOCUMENTS

| | | | | |
|---|---|---|---|---|
| 9,078,452 | B2 | 7/2015 | Ray et al. | |
| 9,579,810 | B2 | 2/2017 | Mascari | |
| 10,040,211 | B2 | 8/2018 | Whited | |
| 10,463,052 | B2 | 11/2019 | Hazenbroek | |
| 11,006,644 | B2 | 5/2021 | Woltman et al. | |
| 11,944,105 | B1 | 4/2024 | Foreman et al. | |
| 2007/0072530 | A1 * | 3/2007 | Sekiguchi .......... | A22C 21/0023 452/169 |
| 2022/0167635 | A1 | 6/2022 | Estes et al. | |

* cited by examiner

POULTRY PROCESSING APPARATUS AND METHOD

TECHNICAL FIELD

The present disclosure relates to a poultry processing apparatus and method for processing a poultry carcass portion including a breast with attached wings, the apparatus including a shackle conveyor or trolley line including a set of uniformly spaced trolleys moving along a trolley path of travel, each trolley including a shackle, an adjacent pair of shackles configured to receive the attached wings of a poultry carcass portion to thereby support the poultry carcass portion for movement along the trolley path of travel, the apparatus further including a cutting module including a cutting assembly having a plurality of cutting heads and first cutting assembly along the trolley path of travel in synchronization with a trolley velocity over a first engagement distance wherein cutting members of the cutting module engage a poultry carcass portion suspended from the adjacent pair of shackles.

BACKGROUND

Processing of poultry involves many labor intensive tasks and continued effort has been made to simplify and automate the process, thereby reducing processing cycle times while still maintaining acceptable yield rates and minimizing product loss. One area of interest involves processing of the front portion of a poultry carcass or frame, often referred to in the poultry processing industry as a “football”. Typically, a manual cone line is used to remove certain meat portions from the football or front part of the poultry carcass. The cone line includes a plurality of tapered, cone-shaped fixtures positioned along and moving with an endless conveyor belt. As the conveyor belt moves, the cone fixtures progress along a longitudinal extent of the conveyor line from a starting end. At the starting end of the cone line, a football poultry carcass is placed onto the each cone fixture, wings up. As the football progresses along the conveyor line, workers positioned along the cone line cut the football to remove desired parts leaving a smaller, front portion of the carcass or frame remaining on the cone fixture. If the wings remain attached to this smaller, front portion of the poultry carcass, the portion is sometimes referred to in the industry as a “butterfly with wings attached”. As used herein, a “butterfly” will refer a poultry carcass portion including a breast portion of the poultry carcass with the wings attached. Further processing of the butterfly involves removal of the two wings from breast. The process of removing the wings from the breast is sometimes referred to as wing rounding. When done manually on a cone line, a straight knife is used by a worker and guided along an arcuate path around the wing joint, that is, the joint where the poultry wing connects to the breast in order to sever the wing from the breast. Manual severing of the two wings from the breast by carefully cutting around each wing joint is a time consuming task and, moreover, requires an experienced and skilled worker who has a proper “feel” of where and how the cut must be made with respect to the wing joint to cleanly sever the wing from the breast, without unduly cutting into or otherwise damaging or wasting any of the valuable breast meat.

Depending on the nature of the desired end product, the severed poultry wings may be further processed by being cut up into wing segments, namely, drumettes, flats and tips. The drumettes and flats are then packaged and sold as precut poultry wings. In such a case, processing of poultry wings includes slicing or cutting the poultry wing at the mid or elbow joint between the drumette and the flat to separate the drumette from the flat and slicing or cutting the lower or wrist joint between the flat and the tip to separate the flat from the tip. An automated poultry wing segmenter and method of segmenting or cutting poultry wings into drumettes, flats and tips is disclosed in U.S. Pat. Nos. 8,517,805, 8,641,487, 8,702,480 and 9,078,452, each of which is assigned to the assignee of the present invention (hereinafter “aforesaid U.S. patents”). Each of the aforesaid U.S. patents are incorporated by reference herein in their respective entireties. The aforesaid U.S. patents disclose an automated poultry wing segmenter or poultry wing segmenter machine, sometimes referred to as a poultry wing portioner or poultry wing portioner machine (hereinafter referred to as a “poultry wing segmenter”) and a method of segmenting or slicing poultry wings into drumettes, flats and tips utilizing the automated poultry wing segmenter.

The poultry wing segmenter disclosed in the aforesaid U.S. patents includes a wing wheel rotating about a vertical axis of rotation which includes a plurality of circumferentially spaced apart lateral troughs which receive the poultry wings for processing. For each of the plurality of lateral troughs of the wing wheel, a first upper wheel segment of the lateral trough receives an upper portion of the poultry wing corresponding to the upper shoulder joint and drumette, a middle wheel segment of the lateral trough receives a middle portion of the poultry wing corresponding to the flat, and a lower wheel segment of the lateral trough receives a lower portion of the poultry wing corresponding to the tip. A pair of stationary cutting blades are received in two axially spaced apart annular slots of the wing wheel. A plurality of wing engaging guide bars bias or urge the poultry wings into the lateral troughs of the wing wheel and position the poultry wings such that as the poultry wings rotate with the wing wheel, the respective elbow and wrist wing joints are presented to the pair of cutting blades to segment or slice the poultry wing into drumette, flat and tip portions. The guide bars push against the poultry wing to position the poultry wing in the lateral trough of the wing wheel and bend the wing appropriately such that the elbow and wrist wing joints are presented to the pair of cutting blades to accomplish Grade A high speed elbow and wrist joint cuts as the wing wheel rotates and the stationary pair of cutting blades slice through the respective elbow and wrist joints, without shattering or fragmenting bone segments of the poultry wing, exposing open bone areas and/or contaminating the segmented drumette, flat and tip portions.

In order to use the poultry wing segmenter, the wings must be individually loaded onto shackles of a trolley line or shackle conveyor. The shackle conveyor includes a plurality of spaced apart trollies or trolley assemblies positioned along a chain drive or trolley chain. Each of the shackle includes an upper portion that extends downwardly from the trolley. As used herein, trolley and trolley assembly will be used interchangeably. Each trolley includes a trolley wheel or caster mechanism that rolls along a trolley track of the shackle conveyor. The shackle of a trolley is thus constrained by the trolley including the caster mechanism, the trolley chain and the trolley track to move about a closed path of travel or closed track in serial fashion defining a trolley path of travel. The rotation of the wing wheel about its vertical axis of rotation and the movement or translation of the shackles along the trolley track is provided by a drive mechanism of the poultry wing segmenter including one or more drive motors and drive transmissions. When engaged, the drive mechanism provides a desired rotational speed of the wing wheel and desired velocity of the trolleys/shackles along the trolley path of travel.

Input of poultry wings to the wing wheel of the poultry wing segmenter is accomplished by placing or hanging individual poultry wings onto respective individual spaced apart shackles of the trollies and then transferring a poultry wing supported by a shackle to a respective lateral trough of the wing wheel. The placing or hanging individual poultry wings onto the shackles is a manual operation performed by workers positioned along the trolley path of travel. By contrast, the transfer of poultry wings from the shackles to the lateral troughs of the wing wheel is an automated function of the poultry wing segmenter. The drive mechanism of the poultry wing segmenter drives the wing wheel to rotate about its vertical rotational axis and drives the shackles to move along the shackle path of travel. In the region of the wing wheel, the shackle path of travel intersects a circular path of travel of the lateral troughs of the wing wheel and the guide bars direct a poultry wing from a shackle of a trolley to a respective lateral trough of the wing wheel. The guide bars facilitate the transfer of the poultry wings from the shackles to the lateral troughs of the wing wheel, that is, the guide bars facilitate mechanical transfer of a poultry wing supported by a shackle to a respective lateral trough of the wing wheel.

While the poultry wing segmenter disclosed in the aforesaid U.S. patents represents a significant advance in poultry wing processing technology and production efficiency, the processes of: a) severing the pair of wings from a front portion of a poultry carcass or poultry carcass butterfly; and b) loading wings into the generally U-shaped openings of the shackles of spaced apart shackle assemblies of a shackle conveyor both remain labor intensive activities. Depending on the desired production output of the poultry wing segmenter, multiple workers are typically required to be positioned along the cone line to cut the wings from the butterfly. Additionally, these workers are then required to further load the severed poultry wings into the shackle openings as the shackles continuously move along the trolley track.

Moreover, cutting of the wings from the poultry butterfly typically requires skilled workers having a proper "feel" for how to manipulate the knife to efficiently cut around the wing joint to sever the wing. Loading of the poultry wings into the shackles is a repetitive task, performed in a cold environment typical of poultry processing facilities. Additionally, if a poultry wing is not properly oriented and fully inserted into the U-shaped opening of the shackle by a worker, the poultry wing may fall out as the shackle assembly traverses its path of travel to the wing wheel and/or may not be transferred appropriately by the guide bars to a respective lateral trough of the wing wheel. Further advances in technology and automation of the process of severing wings from a poultry carcass butterfly and loading poultry wings into the respective openings of shackles of a shackle conveyor to be used in conjunction with a poultry wing segmenter or otherwise remains a continuing objective for designers.

SUMMARY

In one aspect, the present disclosure relates to a poultry processing apparatus for processing a poultry carcass portion including a breast with attached wings, the apparatus comprising: a) a shackle conveyor including a set of trolleys driven to move at a trolley velocity in a flow direction along a trolley track, the trolley track having a trolley ride surface defining a trolley path of travel, each trolley of the set of trolleys supporting a shackle for movement with the trolley along the trolley track, each shackle having a wing-receiving opening centered about a vertical center line of the shackle, the set of trolleys being uniformly spaced along the trolley path of travel such that for a pair of adjacent trolleys of the set of trolleys there is a predetermined distance between vertical center lines of the respective first and second shackles of the pair of adjacent trolleys, each shackle of the respective first and second shackles of the pair of adjacent trolleys receiving a wing of a poultry carcass portion in the wing-receiving opening of the shackle to thereby support a poultry carcass portion for movement along the shackle conveyor; and b) a first cutting module positioned adjacent a processing section of the shackle conveyor, the first cutting module including a cutting head translation assembly and a first cutting assembly including a first cutting head having spaced apart first and second cutting members, the cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity over a first engagement distance.

In another aspect, the present disclosure relates to a method of processing a poultry carcass portion including a breast with attached wings, the steps of the method comprising: a) providing a shackle conveyor including a set of trolleys driven to move at a trolley velocity along a trolley track, the trolley track having a trolley ride surface defining a trolley path of travel, each trolley of the set of trolleys supporting a shackle for movement with the trolley along the trolley track, each shackle having a wing receiving-opening centered about a vertical center line of the shackle, the set of trolleys being uniformly spaced along the trolley path of travel such that there is a predetermined distance between vertical center lines of respective first and second shackles of a pair of adjacent trolleys of the set of trolleys, each shackle of the respective first and second shackles of the pair of adjacent trolleys receiving a wing of a poultry carcass portion in the wing-receiving opening of the shackle to thereby support a poultry carcass portion for movement along the shackle conveyor; b) providing a first cutting module positioned adjacent a processing section of the shackle conveyor, the first cutting module including a cutting head translation assembly and a first cutting assembly including a first cutting head having spaced apart first and second cutting members, the cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity over a first engagement distance; c) supporting a poultry carcass portion the wing-receiving openings of respective first and second shackles of the pair of adjacent trolleys; and d) actuating the first cutting module such that the first and second cutting members of the first cutting head engage the poultry carcass portion.

In another aspect, the present disclosure relates to a poultry processing apparatus for processing a poultry carcass portion including a breast with attached wings, the apparatus comprising: a) a shackle conveyor including a set of trolleys driven to move at a trolley velocity along a trolley track, the trolley track having a trolley ride surface defining a trolley path of travel, each trolley of the set of trolleys supporting a shackle for movement with the trolley along the trolley track, each shackle having a wing-receiving opening centered about a vertical center line of the shackle, the set of trolleys being uniformly spaced along the trolley path of travel such that for a pair of adjacent trolleys of the set of trolleys there is a predetermined distance between vertical center lines of the respective first and second shackles of the pair of adjacent trolleys, each shackle of the respective first and second shackles of the pair of adjacent trolleys receiving a wing of a poultry carcass portion in the wing-receiving opening of the shackle to thereby support a poultry carcass portion for movement along the shackle conveyor; and b) a first cutting module positioned adjacent a processing section of the shackle conveyor, the first cutting module including a cutting head translation assembly and a first cutting assembly including a first cutting head having spaced apart first and second cutting members, the cutting head translation assembly moving the first cutting head between a retracted position and an engaged position in a first direction transverse to the trolley path of travel to engage a poultry carcass portion supported by the first and second shackles of the pair of adjacent trolleys.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described, refer to like parts throughout the drawings and in which.

DETAILED DESCRIPTION

Overview

Figure 1:
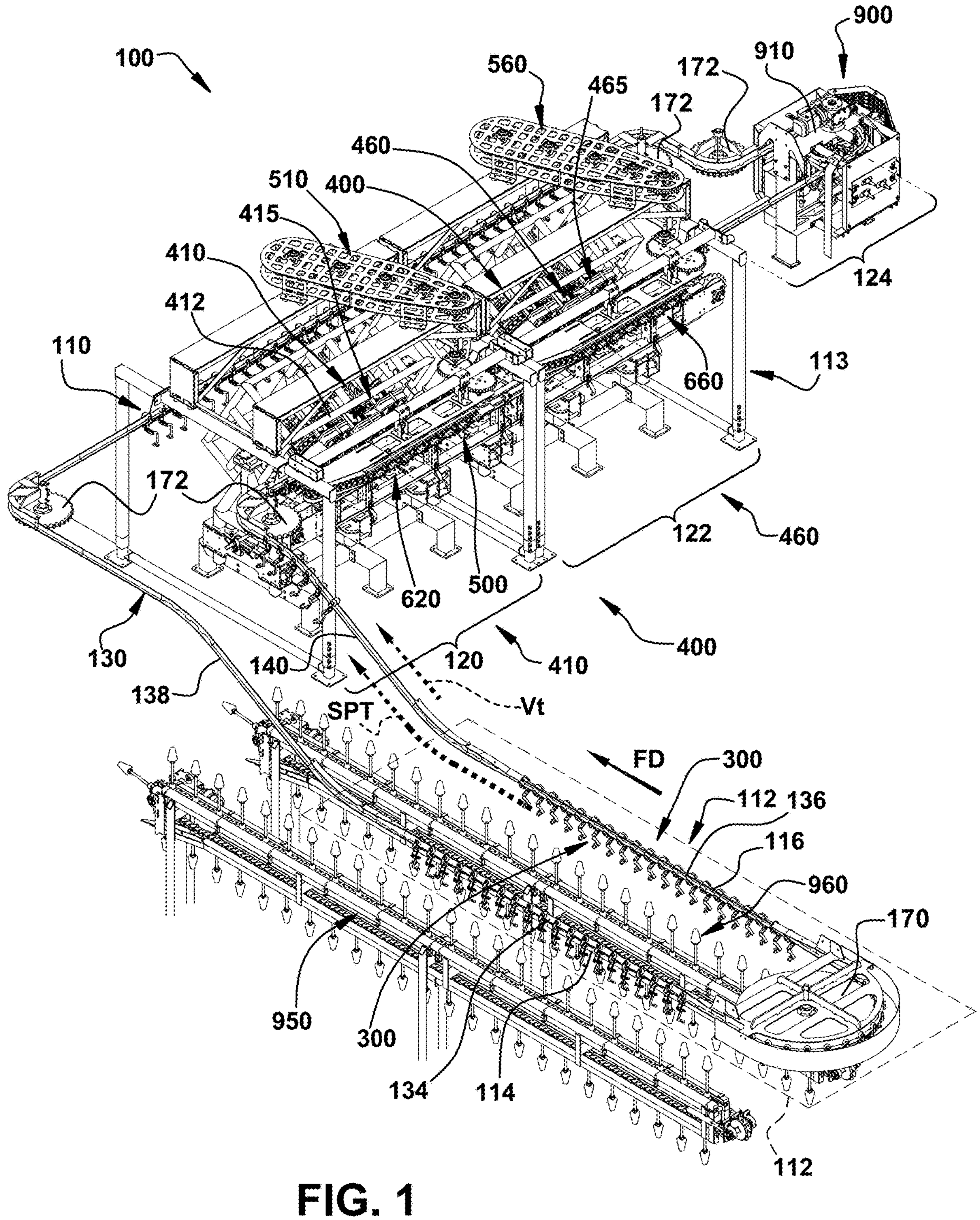
FIG. 1 is a schematic top, front perspective view of a poultry processing apparatus for processing a poultry carcass portion including a breast with attached wings, the apparatus including a shackle conveyor and first and second cutting modules positioned adjacent the shackle conveyor.
Figure 2:
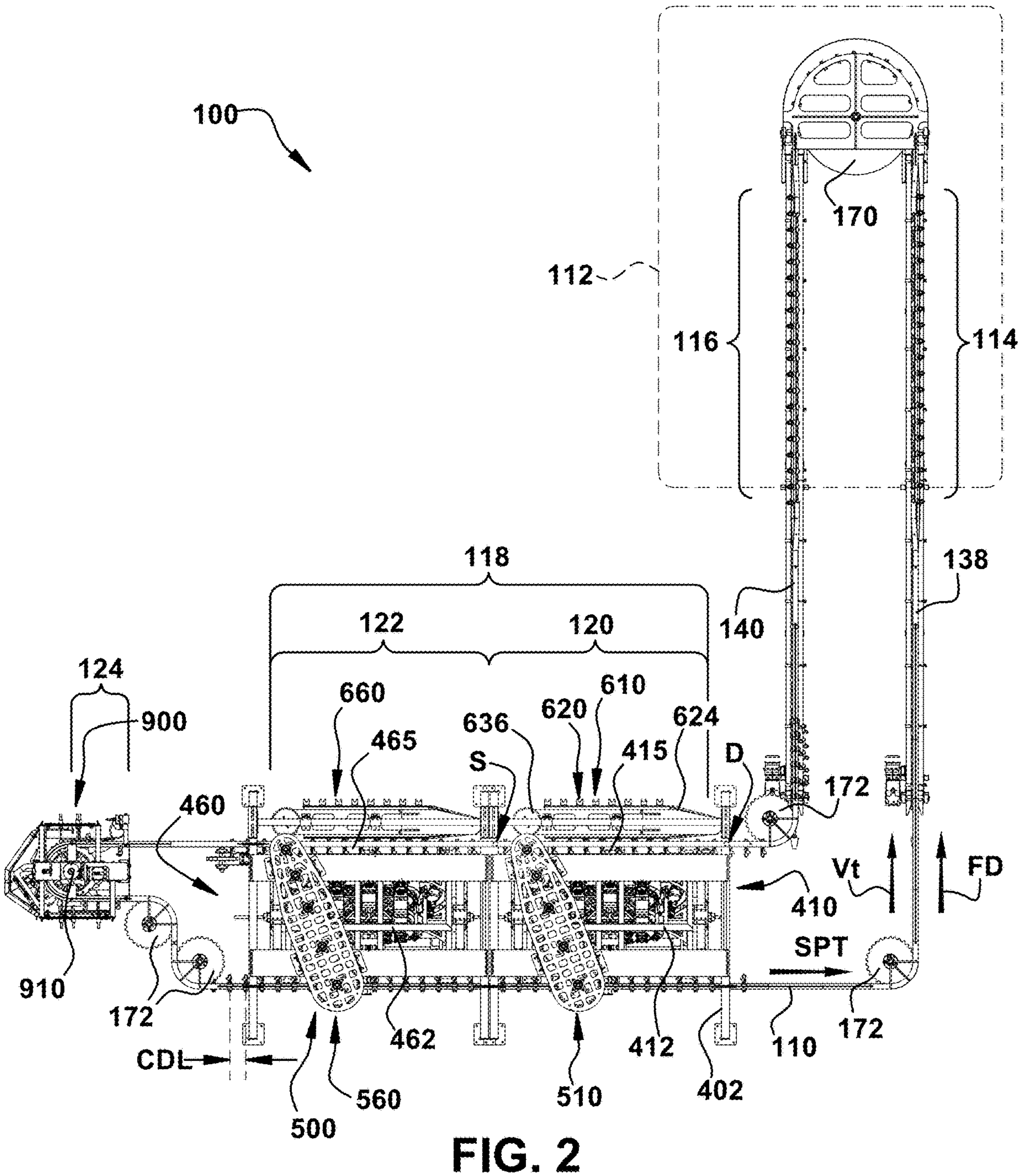
FIG. 2 is a schematic top plan view of the poultry processing apparatus of FIG. 1.
Figure 3:
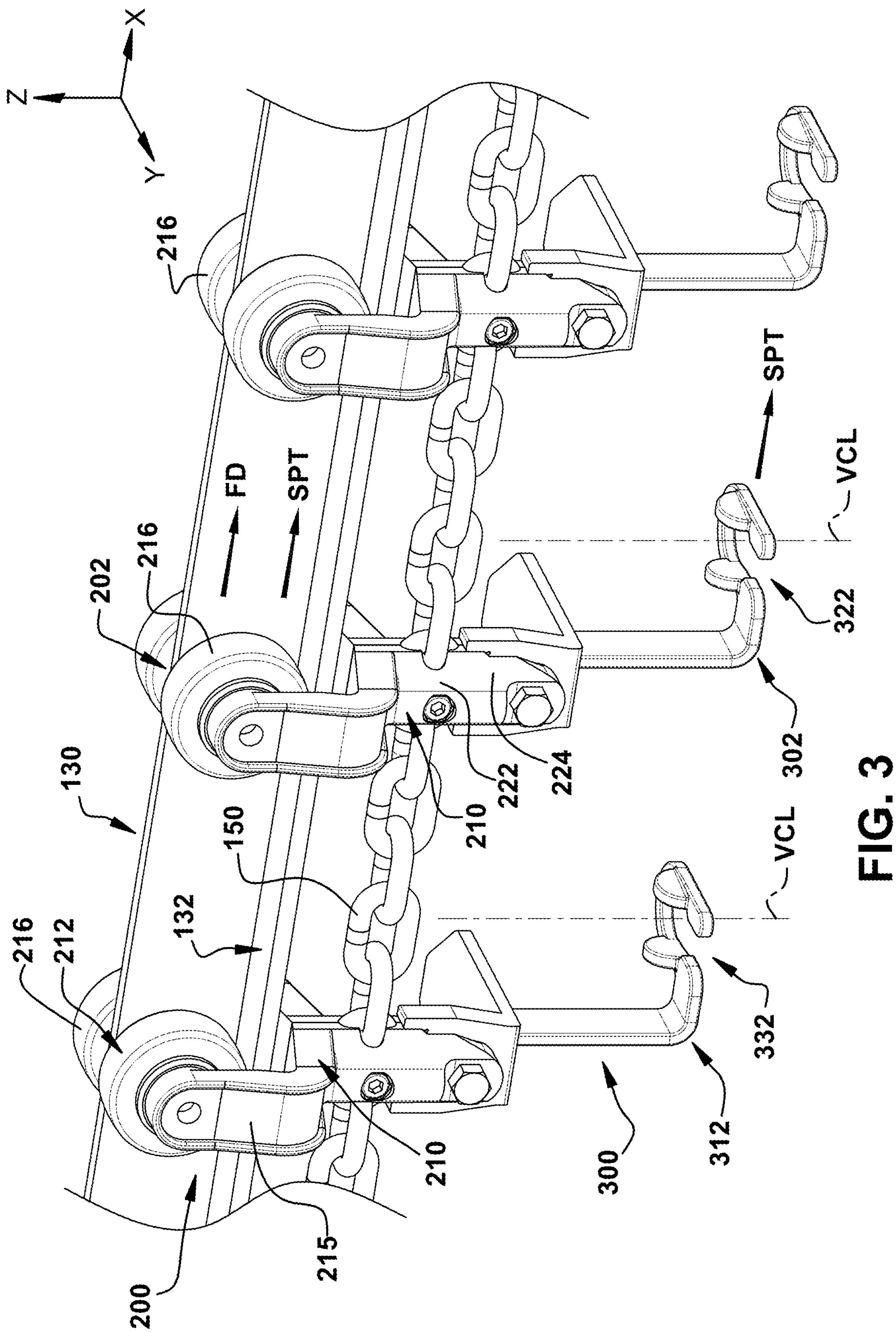
FIG. 3 is a schematic front perspective view of a portion of the shackle conveyor including a series of spaced-apart trolley assemblies or trollies supported on a trolley track and coupled for movement along the track by a drive chain, each trolley of the series of trollies including a shackle having a wing receiving opening for supporting a poultry carcass portion.

The present disclosure relates to a poultry processing apparatus, shown generally at 100 in FIGS. 1 and 2. Advantageously, the poultry processing apparatus 100 of the present disclosure may be used in combination or conjunction with a poultry wing segmenter 900 or other processing or packaging equipment. The poultry processing apparatus 100 is advantageously used to automate the process of poultry wing rounding, that is, removal or severing of poultry wings from an eviscerated poultry carcass portion without the need for human workers to engage in manual cutting of the poultry carcass portion to remove the two wings from the remainder of the poultry carcass portion. Additionally and advantageously, after processing, the severed poultry wings remain held or supported in shackles, for example, adjacent shackles 302, 312 of the shackle conveyor 110, thereby conveniently positioning the severed poultry wings for further processing, for example, by the poultry wing segmenter 900 or other type of processing or packaging equipment, without the need for workers to rehang the poultry wings after the poultry wing rounding process has been completed.

Figure 26:
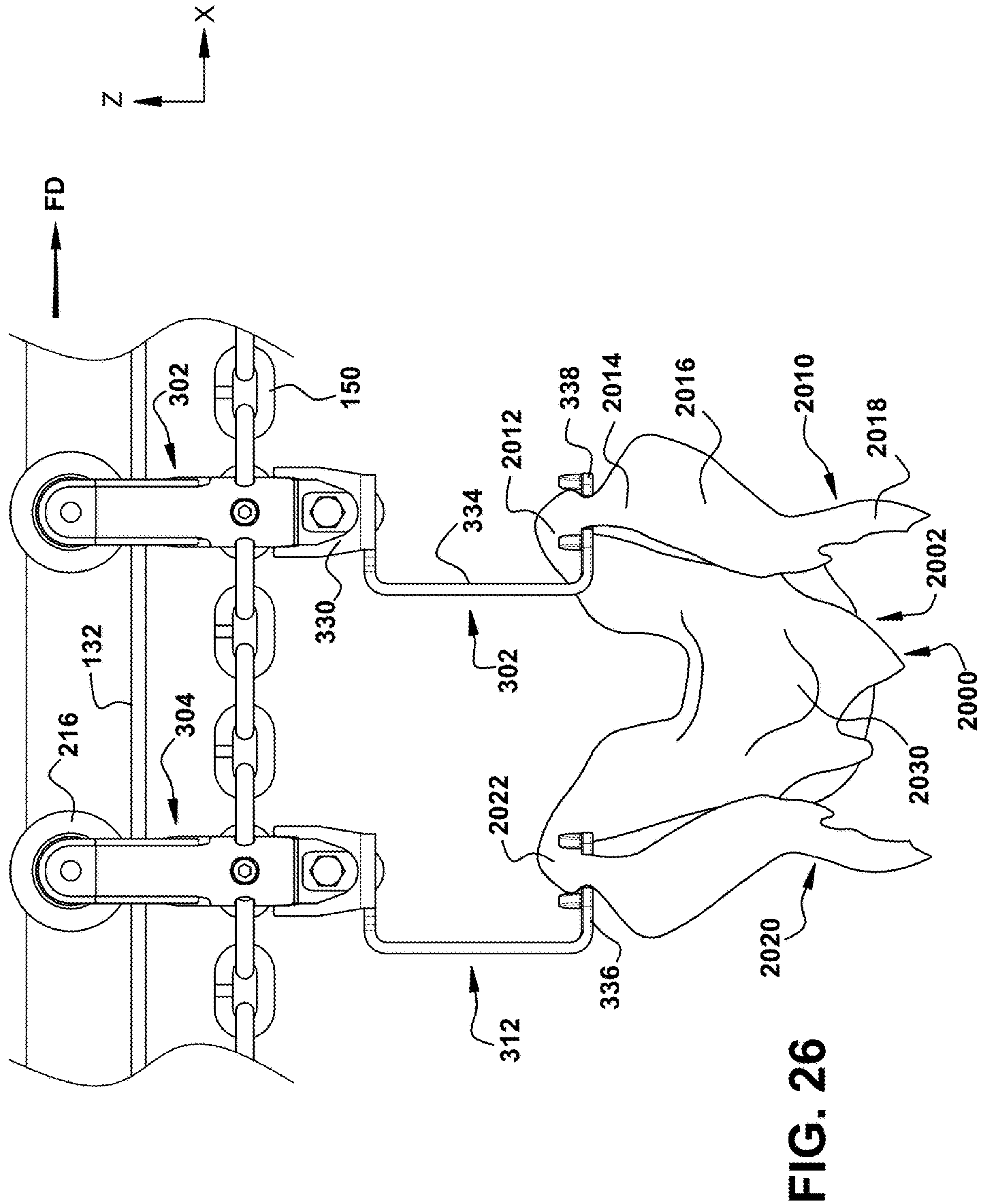
FIG. 26 is a schematic front elevation view of a poultry carcass portion supported by two adjacent shackles of the shackle conveyor.
Figure 27:
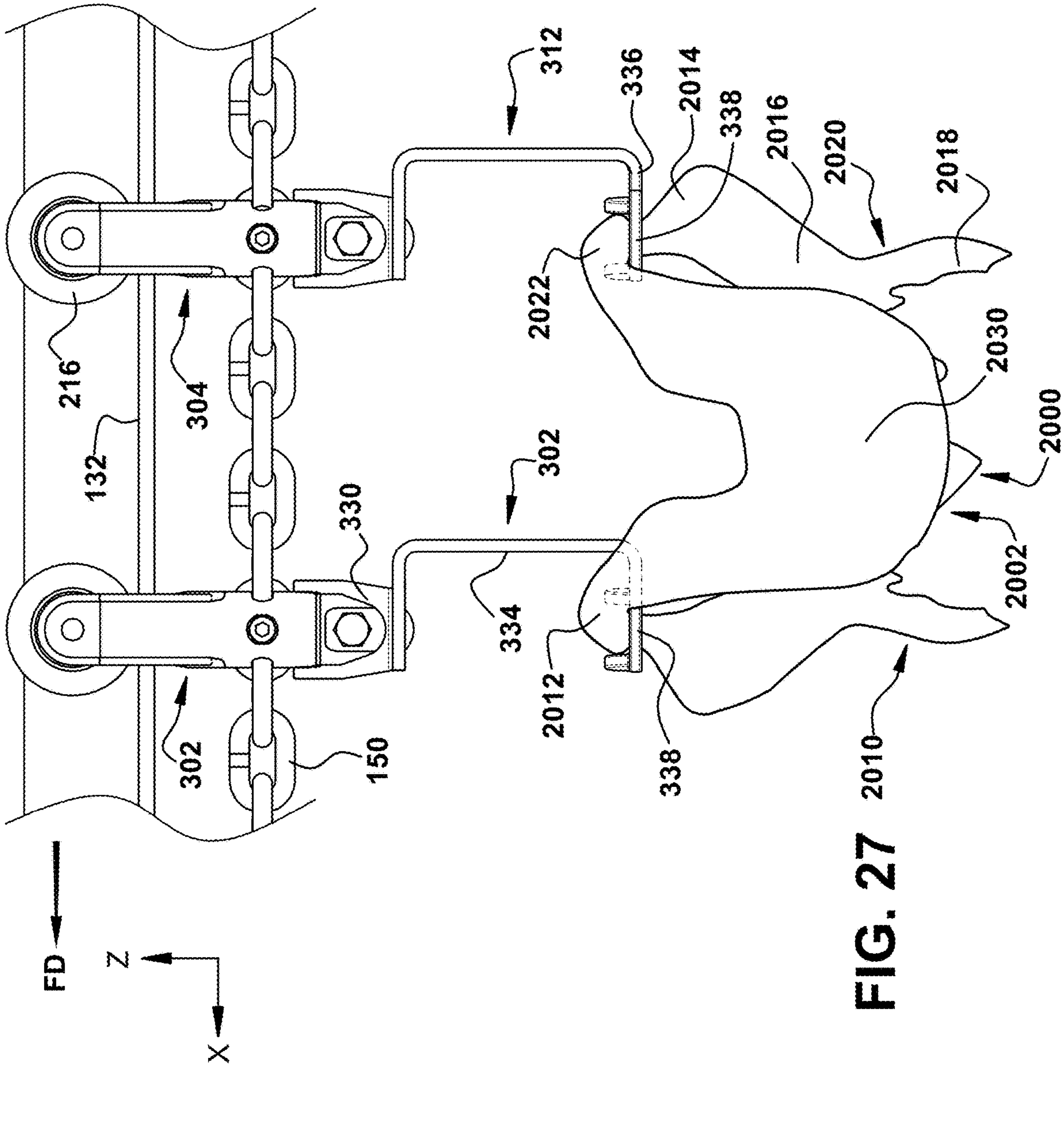
FIG. 27 is a schematic back elevation view of the poultry carcass portion supported by two adjacent shackles of the shackle conveyor of FIG. 26.
Figure 28:
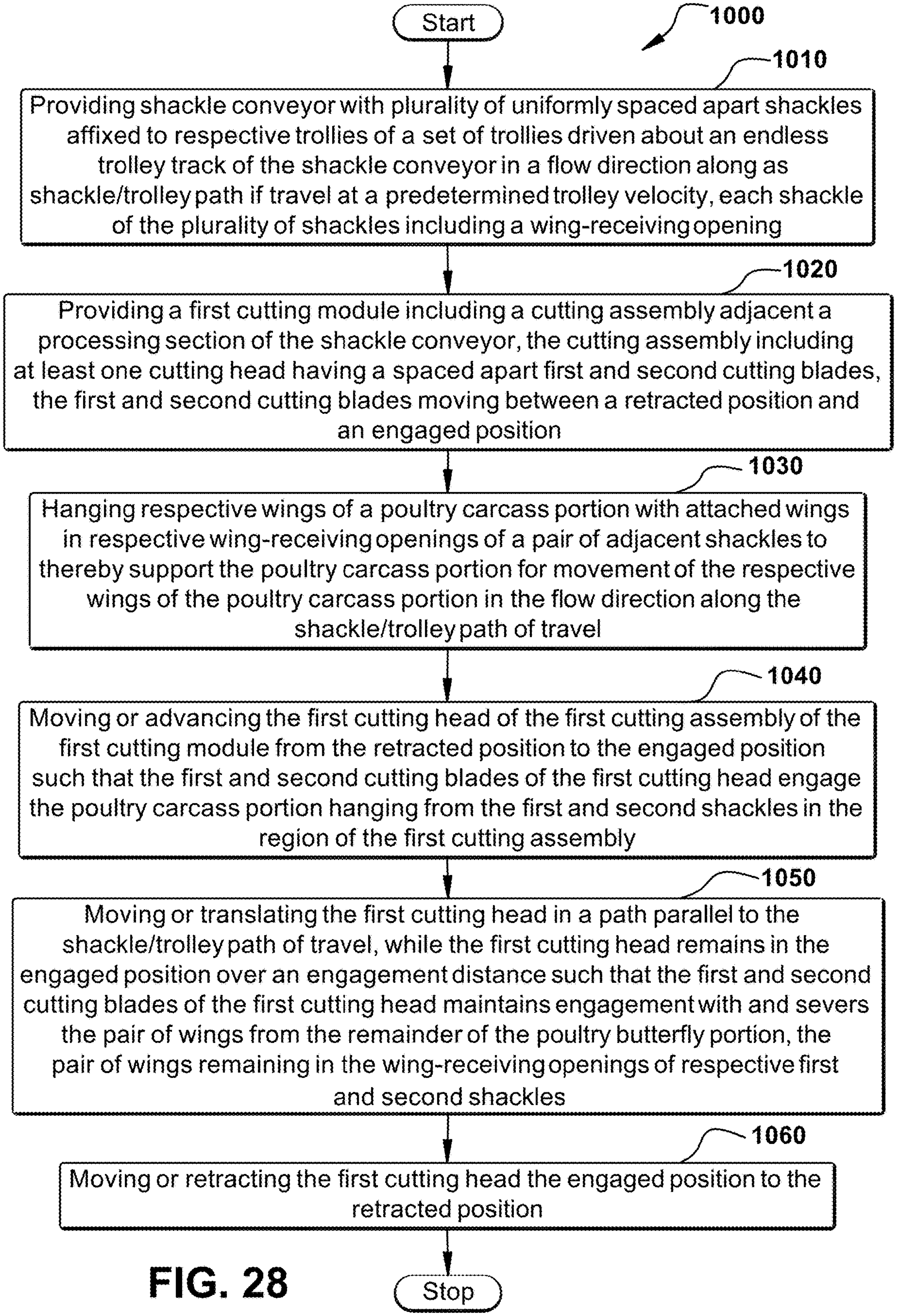
FIG. 28 is a simplified flow chart of depicting one example embodiment of a method of processing poultry utilizing the poultry processing apparatus of the present disclosure.
Figure 29A:
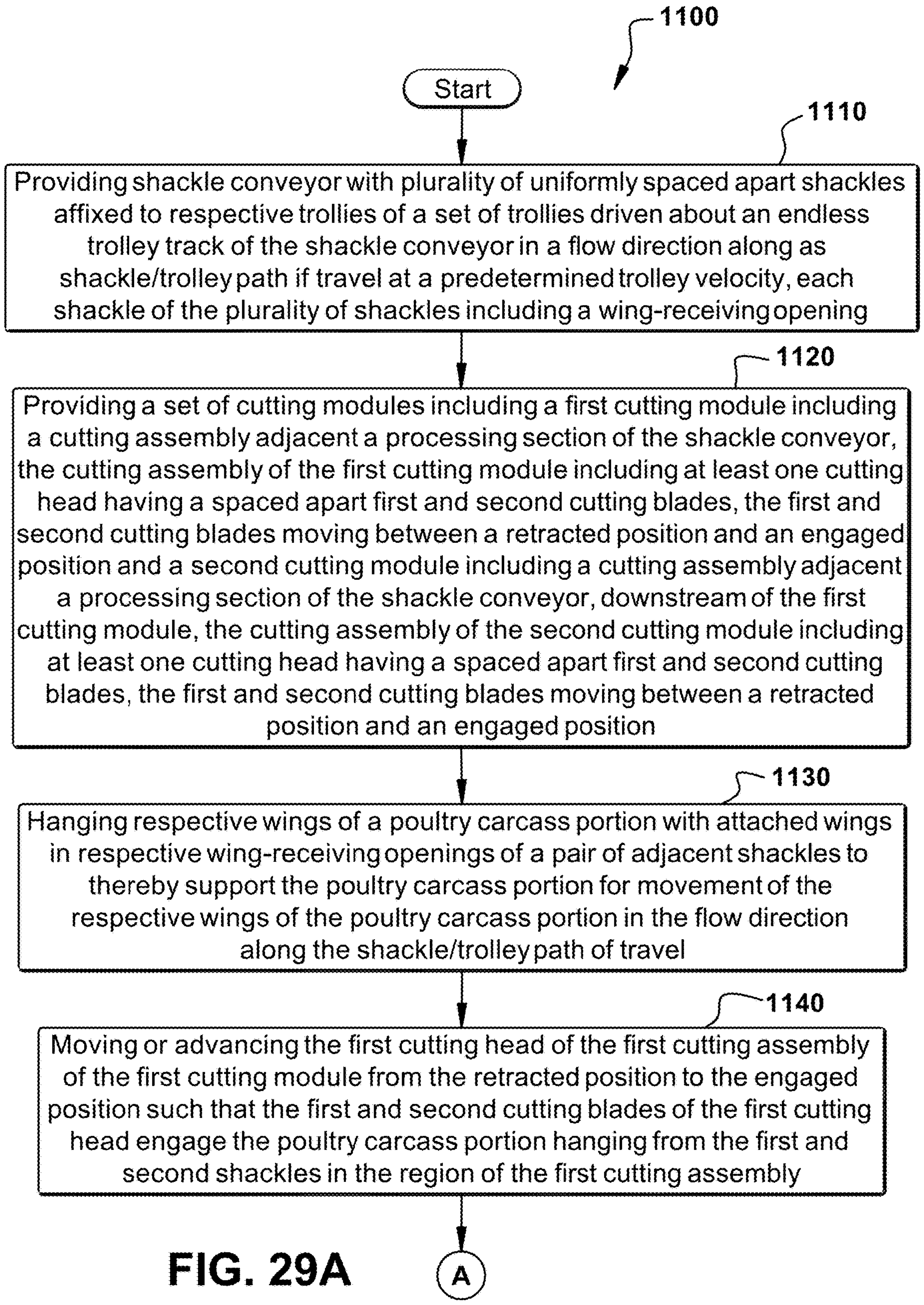
FIG. 29A is a first portion of a simplified flow chart depicting another example embodiment of a method of processing poultry utilizing the poultry processing apparatus of the present disclosure.
Figure 29B:
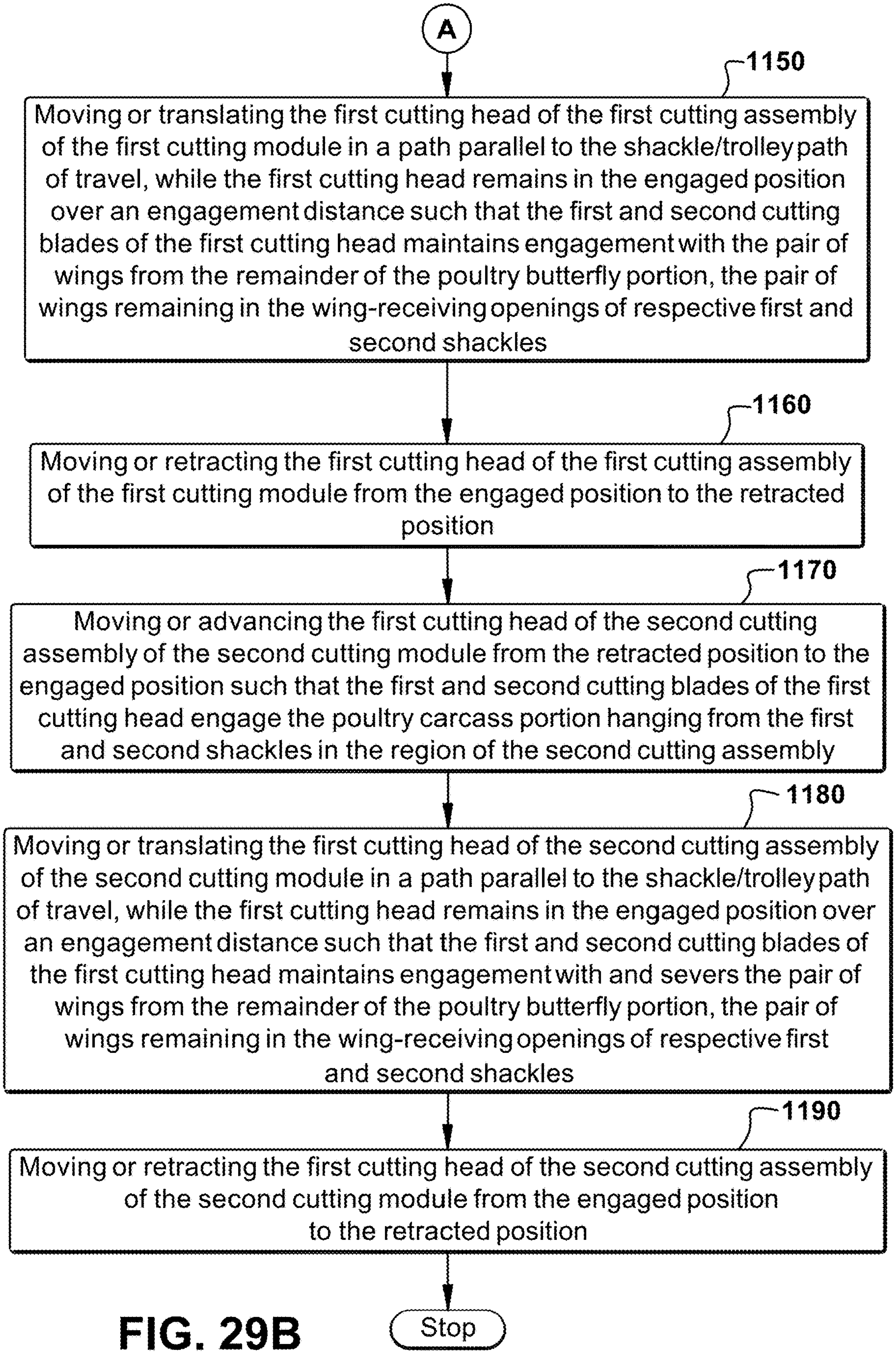
FIG. 29B is a second portion of the simplified flow chart of FIG. 29A.
Figure 30:
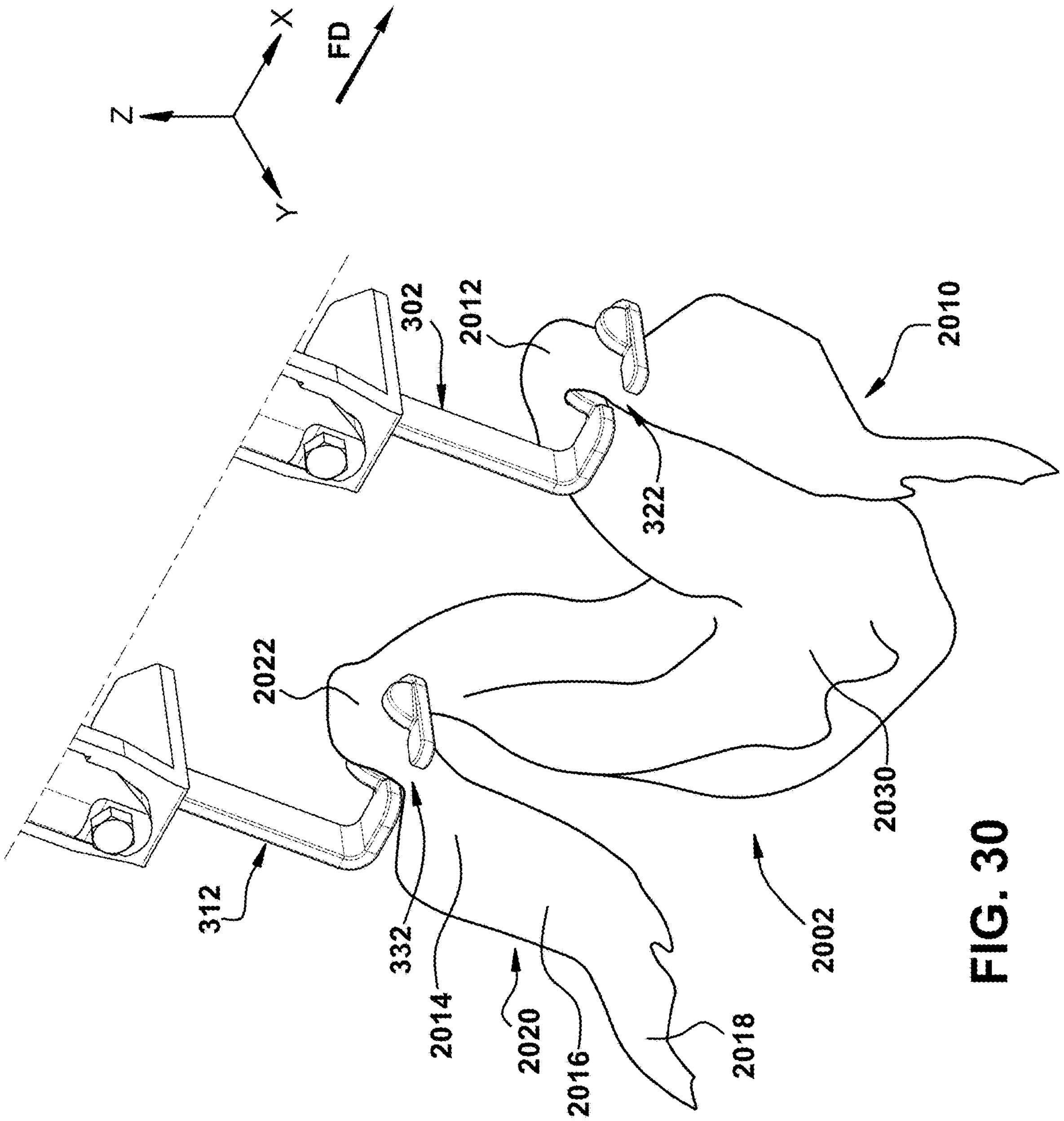
FIG. 30 is a schematic front perspective view of the poultry carcass portion supported by two adjacent shackles of the shackle conveyor of FIG. 26.

In one example embodiment, poultry processing apparatus 100 is suitable for processing eviscerated poultry carcass portions, for example, the poultry carcass portion 2000 shown in FIGS. 26 & 27. In one example embodiment, the poultry carcass portion 2000 is a front portion of the poultry carcass referred to in the industry as a butterfly with wings attached portion 2002, that is, a breast portion with the two wings attached to opposite sides of the breast portion. As used herein, the term "poultry carcass portion" will be understood to mean any eviscerated poultry carcass portion that includes a poultry breast or poultry breast portion with wings attached to opposite sides of the breast or breast portion. This would include, of course, a butterfly with wings attached portion 2002 as a subset of poultry carcass portions 2000. A butterfly with wings attached portion 2002 is typically understood to mean a specific type or configuration of a poultry carcass portion with attached wings that typically results from processing a poultry frame portion sometimes referred to as a "football" on a cone line resulting in a butterfly or butterfly portion, i.e., a poultry carcass portion including a poultry breast with attached wings. The term "breast" or "breast portion" as used herein is understood to include all breast configurations including what is sometimes referred to as a joined breast, i.e., a breast with both left and right sides of the breast. The term "breast with attached wings" or "breast portion with attached wings" as used herein is understood to including all poultry breast and attached wing configurations. The poultry carcass portion 2000, which in one example, comprises a butterfly 2002 with attached wings, includes first and second wings 2010, 2020 connected by a breast portion 2030. The first and second wings 2010, 2020 are connected to the breast portion 2030 at respective first and second wing joints 2012, 2022.

The wing rounding function performed by the poultry processing apparatus 100 of the present disclosure involves cutting around the respective wing joints 2012, 2022 to sever the first and second wings 2010, 2020 from the breast portion 2030. The cuts around the wing joints 2012, 2022 must be precise and accurate to avoid damaging the wings 2010, 2020 or leaving an unacceptably large quantity of higher value breast meat on an upper portion (the drumette) of the severed wings 2010, 2020. The first and second wing joints 2012, 2022 of the first and second wings 2010, 2020 are inserted into respective generally U-shaped wing receiving openings 322, 332 of the adjacent shackles 302, 312. The wing joints 2012, 2022, being larger than the wing receiving openings 322, 332 of the shackles 302, 312, are thus constrained by and supported by respective regions 323, 333 of the shackles 302, 312 adjacent to or defining the wing-receiving openings 322, 332 of the first and second shackles 302, 312. Accordingly, the butterfly portion 2002 is suspended between or bridges the adjacent shackles 302, 312. With the poultry processing apparatus 100 of the present disclosure, the cutting blades 430, 440 of the first cutting head 420*a* of the cutting assembly 415 of the first cutting module 410 engage the first and second wing joints 2012, 2022 and perform the wing rounding function, that is, the first and second wings 2010, 2020 of the butterfly 2000 are severed from the breast portion 2030. With the poultry processing apparatus 100 of the present disclosure, the severed breast portion 2030 is directed away from the adjacent first and second shackles 302, 312, thereby advantageously leaving the first and second wings 2010, 2020 secured and supported in the wing receiving openings 322, 332 of the first and second shackles 302, 312, while the breast portion 2030 is removed for further processing and/or packaging.

The poultry wing processing apparatus 100 includes a shackle conveyor 110 for moving poultry carcass portions along a path of travel SPT in a flow direction FD from a first input section 112 of the shackle conveyor 110, where the poultry carcass portions, for example, representative poultry carcass portion 2000, such as the butterfly portion 2002, are suspended between adjacent first and second shackles, for example, representative adjacent first and second shackles 302, 312, to a third transfer or output section 124 of the shackle conveyor 110 where the severed, hanging poultry wings, for example, representative poultry wings 2010, 2020, now severed from the remainder of the poultry carcass portion 2000, are transferred or otherwise removed from their adjacent shackles 302, 312 for further processing and/or packaging. For example, in one example embodiment, the severed poultry wings 2010, 2020 are transferred to the aforementioned poultry wing segmenter 900 for cutting the wings into drumette 2014, flat 2016 and tip 2018 portions. In one example embodiment, as discussed previously, the poultry carcass portion 2000 will comprise or include what is commonly referred to as the butterfly portion 2002 of a poultry carcass, that is, a poultry carcass portion that includes the poultry breast portion 2030 and attached wing portions 2010, 2020. The poultry processing apparatus 100 will function to sever the wings 2010, 2020 from the breast portion 2030 at respective wing joints 2012, 2022 of the wings 2010, 2020, (typically referred to as wing rounding, as explained previously) while the wings 2010, 2020 remain suspended or hanging in the adjacent first and second shackles 302, 312.

Each shackle of the set of shackles 300 of the shackle conveyor 110 is affixed to and supported by a trolley or trolley assembly of a set of trollies 200 of the shackle conveyor 110. The trollies of the set of trollies 200 ride along an upper or ride surface 132 of a continuous trolley track 130 and are uniformly spaced apart along and affixed to a trolley chain 150. The trolley chain 150 is moved with respect to the stationary trolley track 130 at a desired predetermined speed or trolley velocity Vt by a motor/gearbox arrangement 910.

As used herein, the path of travel SPT will be interchangeably used to refer to: a) the poultry wing path of travel; b) the shackle path of travel; and c) the trolley path of travel. All three of the paths of travel are substantially parallel because the trollies, shackles and supported wings are all coupled or connected. That is, the trollies, for example, representative trollies 202, 212 of the set of trollies 200, support respective representative shackles 302, 312 of the set of shackles 300, which, in turn, support representative poultry wings 2010, 2020 of the butterfly portion 2002. In one example embodiment, the motor/gearbox arrangement 910 is also used to provide motive power to rotate an automated poultry wing segmenter 900 at a predetermined angular velocity that is in synchronization with the trolley velocity Vt. Details of the automated poultry wing segmenter and method of segmenting or cutting poultry wings into drumettes, flats and tips is disclosed in previously mentioned U.S. Pat. Nos. 8,517,805, 8,641,487, 8,702,480 and 9,078,452, which are incorporated by reference herein in their respective entireties.

In addition to the shackle conveyor 110, the poultry processing apparatus 100 includes a set of cutting modules 400 that perform the wing cutting operations. In one example embodiment, there are two adjacent cutting modules 410, 460 positioned along and in proximity to the shackle convey 110 in a third processing section 118 of the shackle conveyor 118. More specifically, the first cutting module 410 is positioned adjacent a first section or portion 120 of the second processing section 118 of the shackle conveyor 130, while the second cutting module 460 is positioned adjacent a second portion or section or portion 122 of the second processing section 118 of the shackle conveyor 110. Each cutting module 410, 460 includes a respective cutting assembly 415, 465 that includes a plurality of cutting heads 420, 470. Each cutting head of the plurality of cutting heads includes a pair of cutting blades 430, 440. In one example embodiment, the first and second cutting blades 430, 440 are power driven, rotary cutting blades. For example, in representative cutting head 420*a* of the first cutting assembly 415 of the first cutting module 410, the cutting head 420*a* includes first and second power driven rotary knife blades 430, 440 supported by a cutting blade housing 428.

The first and second blades 430, 440 are spaced in the flow direction FD by the distance between the respective vertical center lines VCL such that, in an engagement or engaged position EP of the cutting head 420*a*, the first and second cutting blades 430, 440 engage the respective wing joint 2012, 2022 of the suspended butterfly portion 2002, as the wings are suspended or held in the respective shackle wing-receiving openings 322, 332 of the shackles 302, 312 of the set of shackles 300. In one example embodiment, the vertical center lines VCL of the adjacent shackles, for example, representative adjacent shackles 302, 312, are spaced apart six inches. Accordingly, adjacent trollies 202, 212 of the set of trollies 200 are spaced apart by the same six inches and the axes of rotation of the first and second blades 430, 440 of the representative cutting head 420*a* is also spaced apart by the same six inches. Indeed, as viewed along a horizontal axis, all adjacent cutting blades, whether they are from the same cutting head, for example, the first and second cutting blades 430, 440 of the cutting head 420*a* or a first cutting blade from one cutting head and a second cutting blade from an adjacent cutting head, for example, representative adjacent cutting heads 420*a*, 420*b* of the first cutting module 410, are also spaced apart horizontally by six inches, between their respective axes of rotation.

Figure 21A:
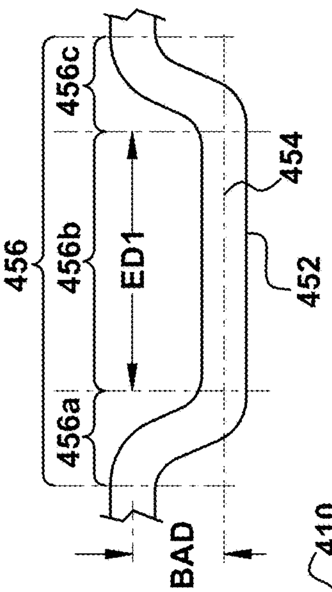
FIG. 21A is a schematic top plan view of a portion of a linear cam track of a cam mechanism of the first cutting module of FIG. 20, as shown in dashed line labeled FIG. 21A in FIG. 20.

Moreover and advantageously, in the poultry processing apparatus 100 of the present disclosure, the cutting head 420*a* moves along the shackle path of travel SPT at the trolley travel velocity Vt such that the engaged position EP is maintained for a desired predetermined engagement distance ED1 thereby allowing for a better cutting action by the first and second power driven rotary knife blades 430, 440. Stated another way, advantageously, when in cutting head 420*a* and, therefore, the cutting blades 430, 440 are in the engaged position EP, movement of the cutting head 420*a* along the path of travel SPT in synchronization with the movement of the wings along the path of travel SPT means that rotating cutting blades 430, 440 have a longer duration of time or dwell time to make their respective cuts. This improves the quality of the wing rounding cuts, as compared with a situation where the first and second cutting blades 430, 440 are stationary with respect to the continuously moving shackles and wings. In one example embodiment, the engagement distance ED1 is approximately 10 inches (FIG. 21A).

In order to achieve this dual action movement of the first and second cutting blades 430, 440 of the cutting head 420*a*, the first cutting module 410 includes a dual action or dual direction cutting head translation mechanism or cutting head translation assembly 414 which, in one example embodiment, includes a linear cam mechanism 450 defining a cam track slot 454 and a drive belt arrangement 416 wherein the plurality of cutting heads 420 (including the first cutting head 420*a*) of the first cutting assembly 415 are affixed to and move with a drive belt assembly or arrangement 416 of the cutting head translation assembly 416 at a belt travel velocity that corresponds to trolley travel velocity Vt. The linear cam mechanism 450 cooperates with the drive belt arrangement 416 such that, when a cam follower pin 426 of the first cutting head 420*a* enters a two axis movement section or portion 456 of the cam track slot 454, the following movements of the first cutting head 420*a* occur sequentially: a) in a first, cutting head or blade advancement portion 456*a* of the two axis movement section 456 of the cam track slot 454, as viewed in side elevation view (FIGS. 18 & 22), that is, as viewed along the shackle path of travel SPT, the first cutting head 420*a* is moved forward along a line of action LN1 (toward the wing path of travel SPT) so that the first and second cutting blades 430, 440 move from the retracted position RP to the engaged position EP of the first cutting head 420*a* to engage the respective wing joints 2012, 2022; b) in a second, cutting head or blade parallel translation portion 456*b* of the two axis movement section 456, the cutting head 420*a* moves parallel to the shackle path of travel SPT such that the first and second cutting blades 430, 440, which are in the engagement position EP, perform cutting operations over the engagement distance ED1 and thereby perform the wing rounding function; and c) in a third, cutting head or blade retraction portion 456*c* of the two axis movement section 456, as viewed in side elevation view, that is, as viewed along the shackle path of travel SPT, the first cutting head 420*a* is moved rearward or backward along the line of action LN1 (away from the wing path of travel SPT) so that the first and second cutting blades 430, 440 move from the engaged position EP of the first cutting head 420*a* to the retracted position RP.

Figure 18:
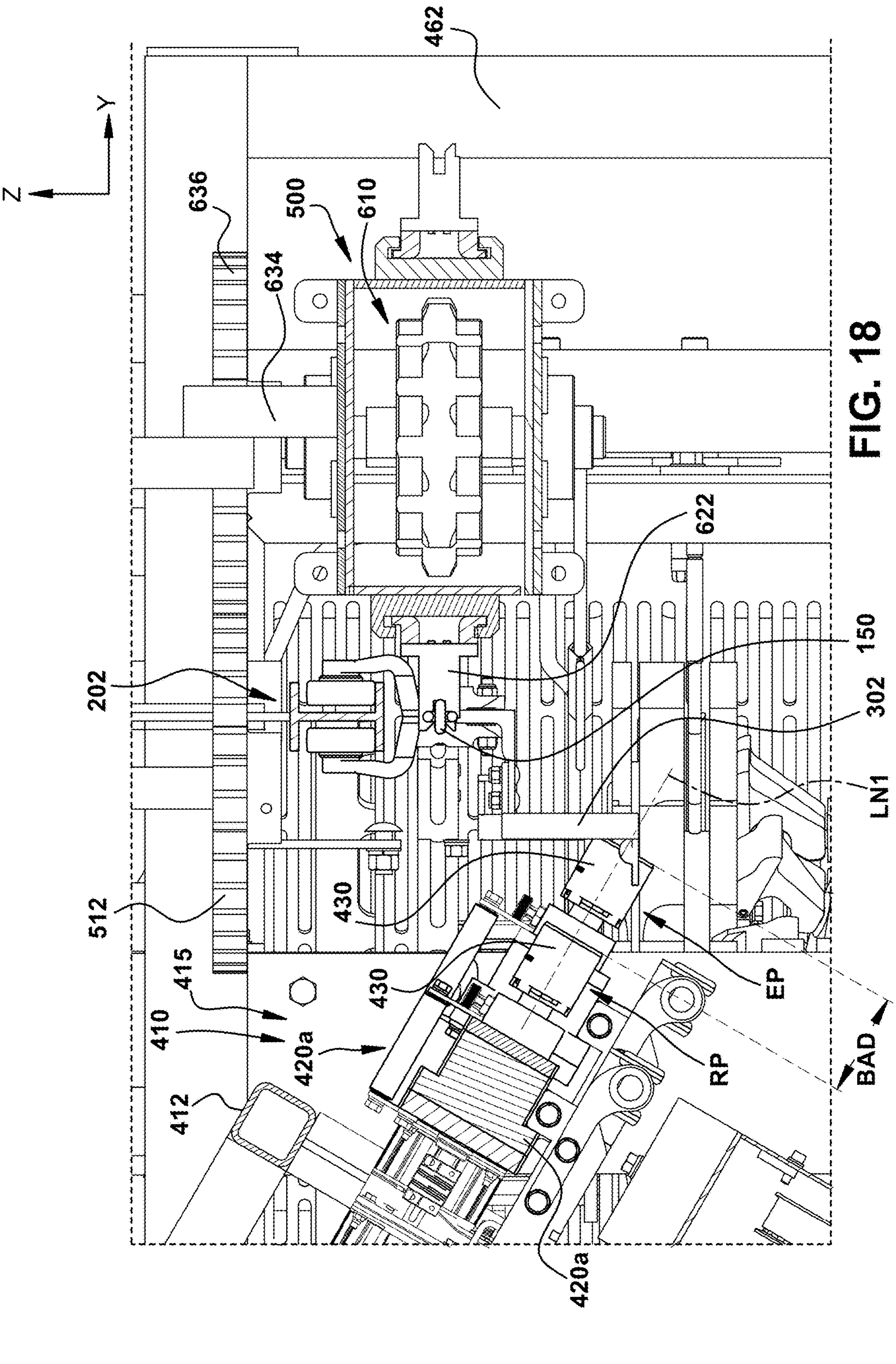
FIG. 18 is a schematic side elevation view, partly in vertical section, of a portion of the poultry processing apparatus of FIG. 1 in the region of the first cutting module, showing a cutting blade in a retracted position and in an engaged position and a blade travel distance therebetween.
Figure 19:
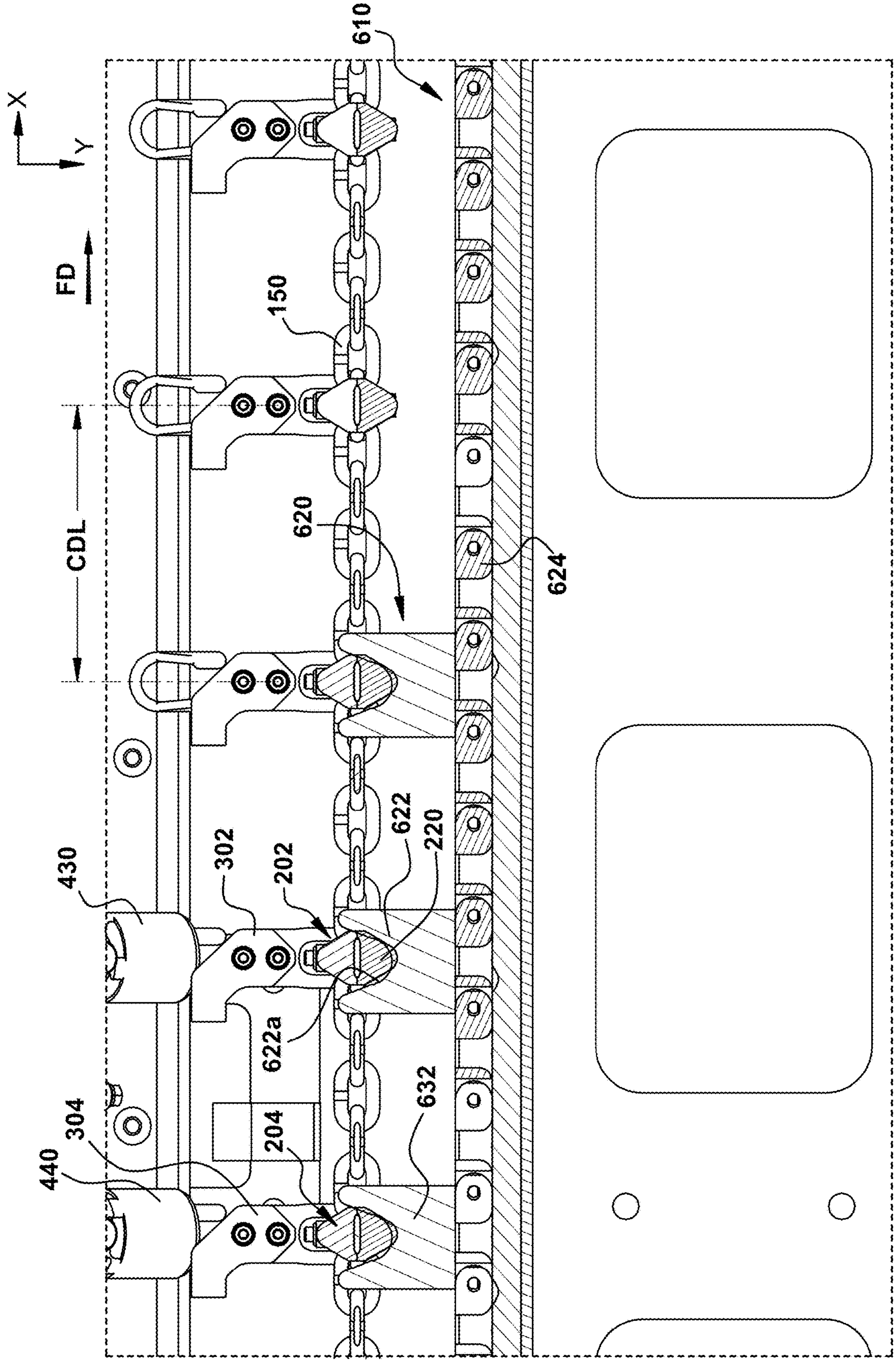
FIG. 19 is schematic top plan view, partly in horizontal section, of a portion of the poultry processing apparatus of FIG. 1 in a region of the first cutting module, showing a portion of the shackle conveyor and a cutting module power and timing conveyor of the first cutting module.
Figure 20:
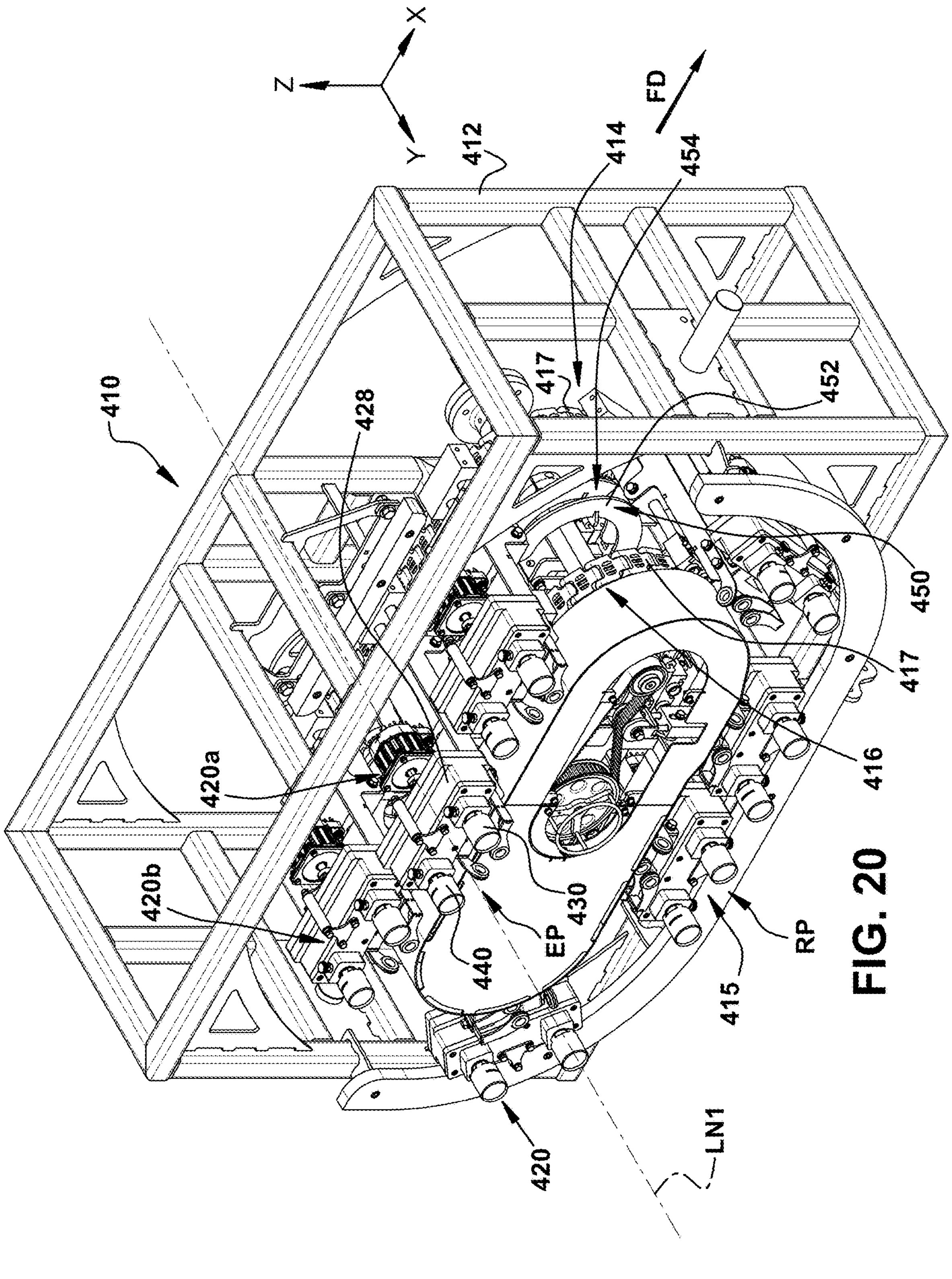
FIG. 20 is a schematic front perspective view of the first cutting module of the poultry processing apparatus of FIG. 1.
Figure 21:
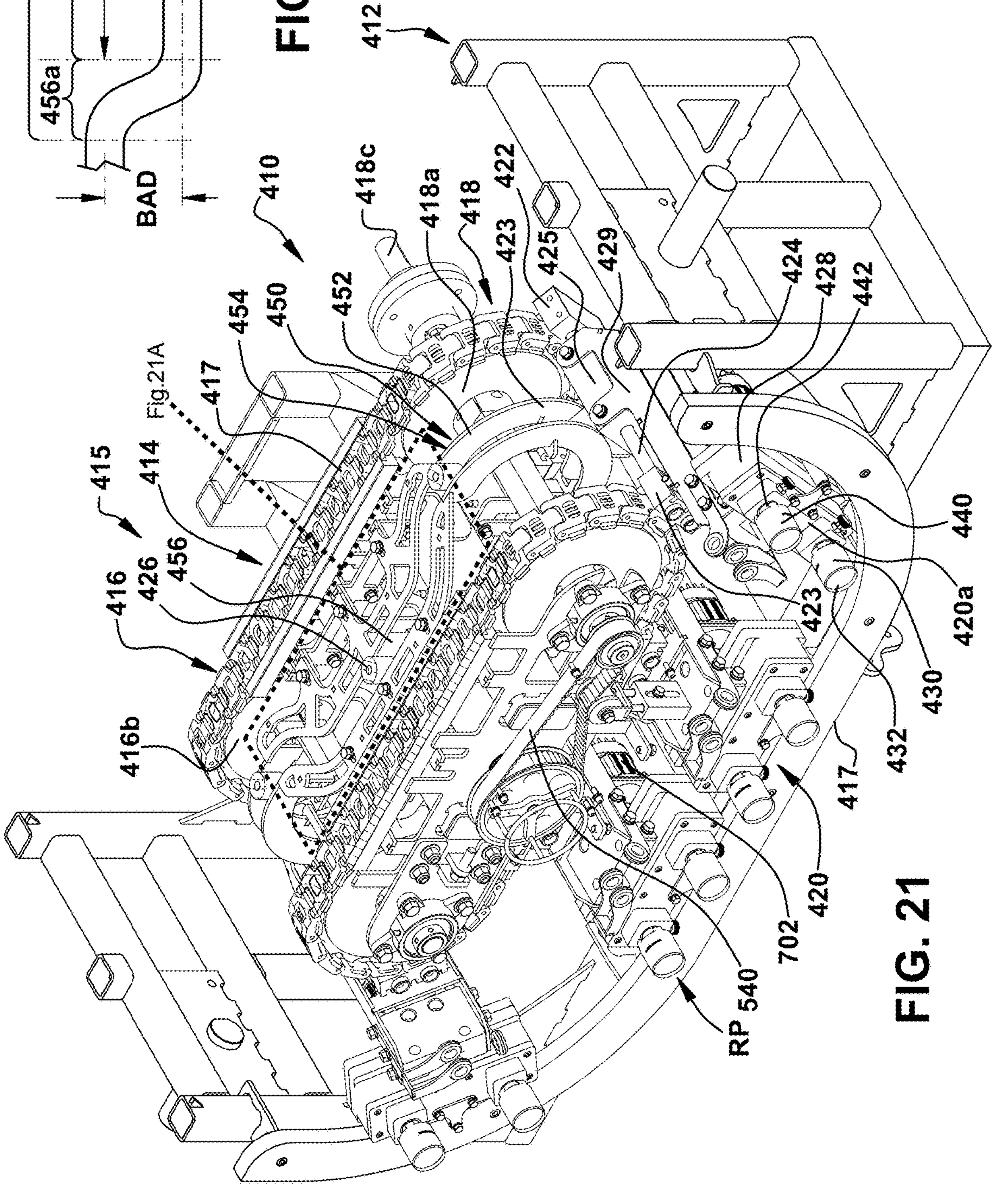
FIG. 21 is a schematic front perspective view of the first cutting module of FIG. 20, with certain components removed for ease of viewing.
Figure 22:
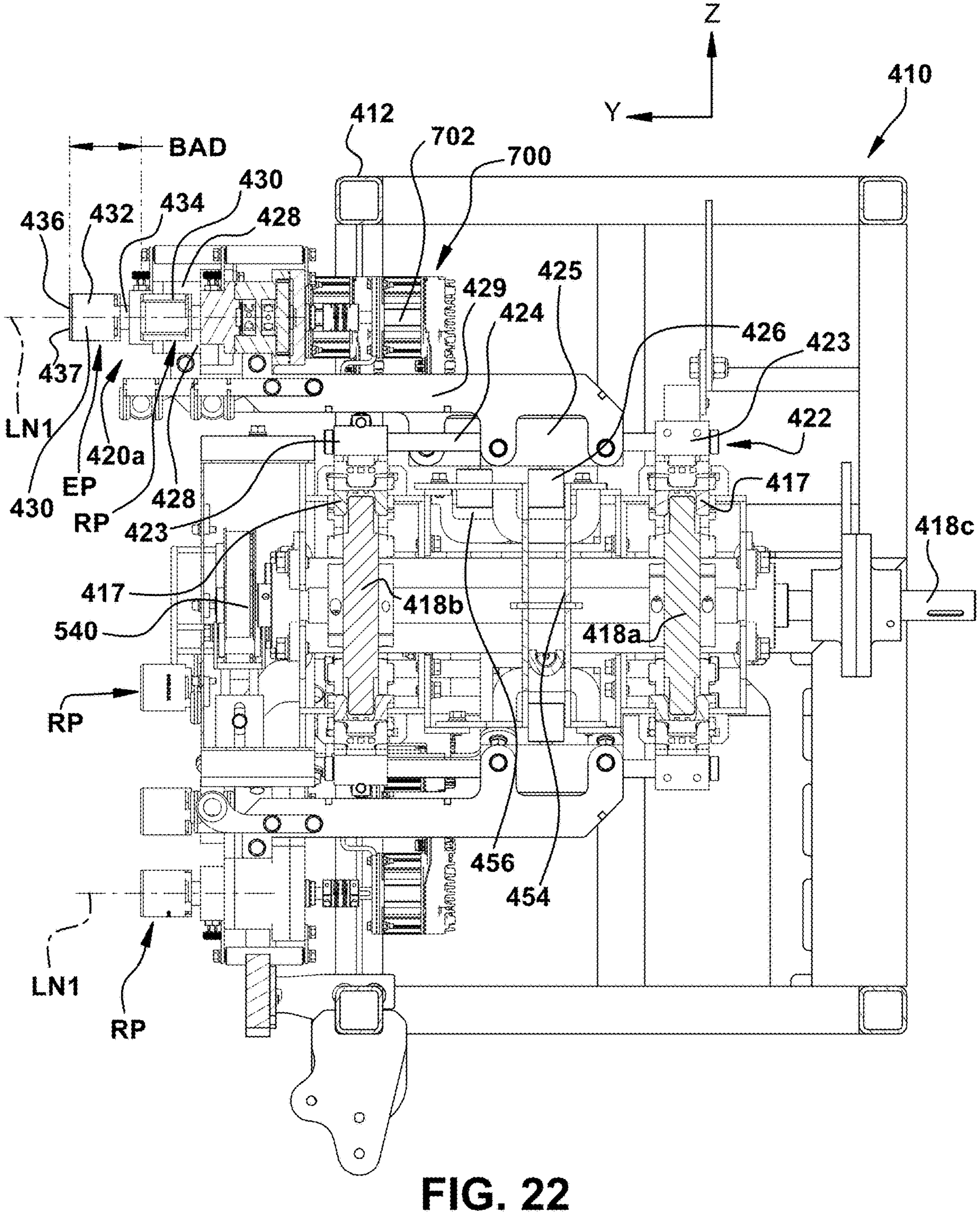
FIG. 22 is a schematic side elevation view, partly in vertical section, of the first cutting module of FIG. 20.
Figure 23:
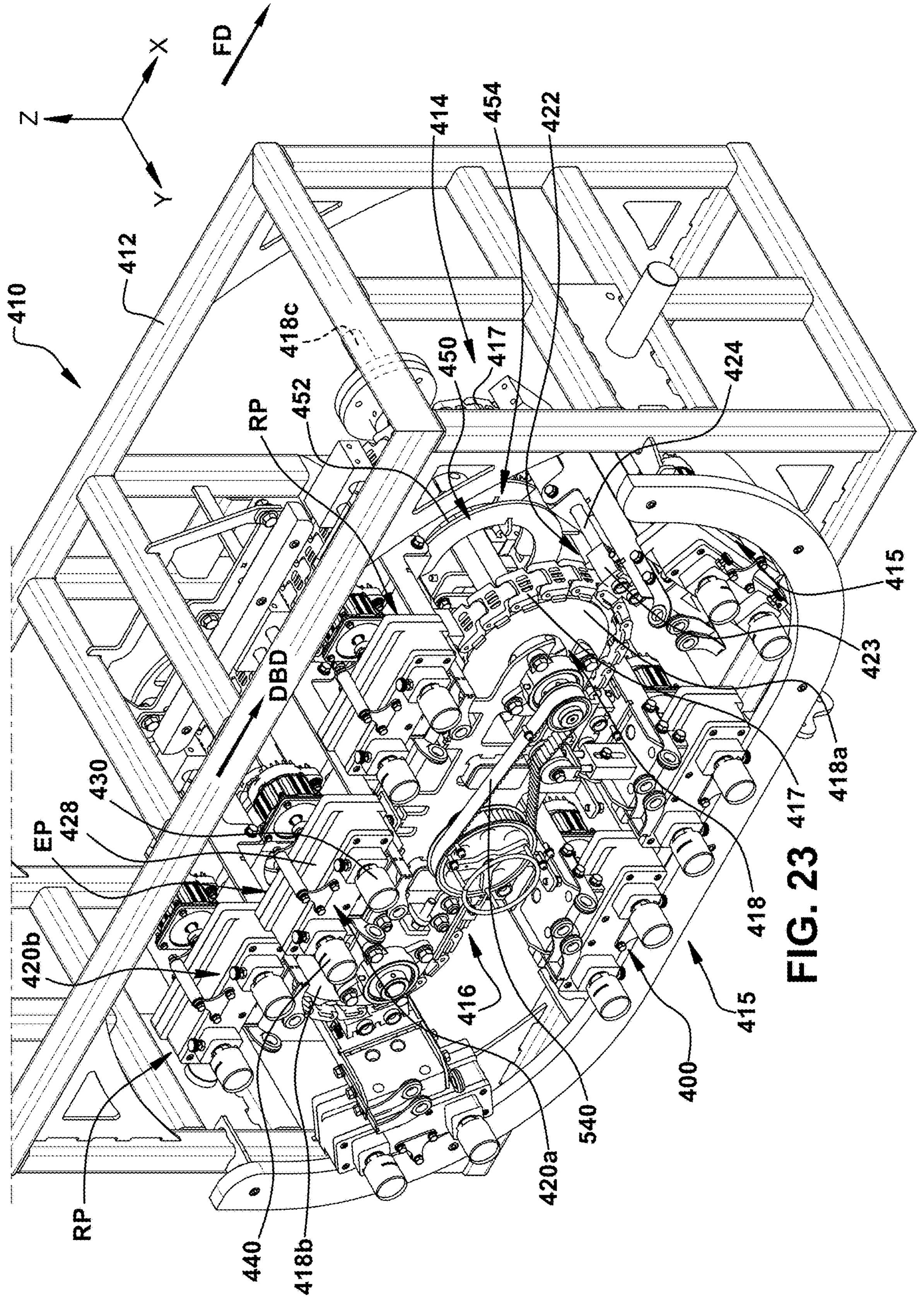
FIG. 23 is a schematic front perspective view of the first cutting module of FIG. 20, with certain components removed for ease of viewing.
Figure 24:
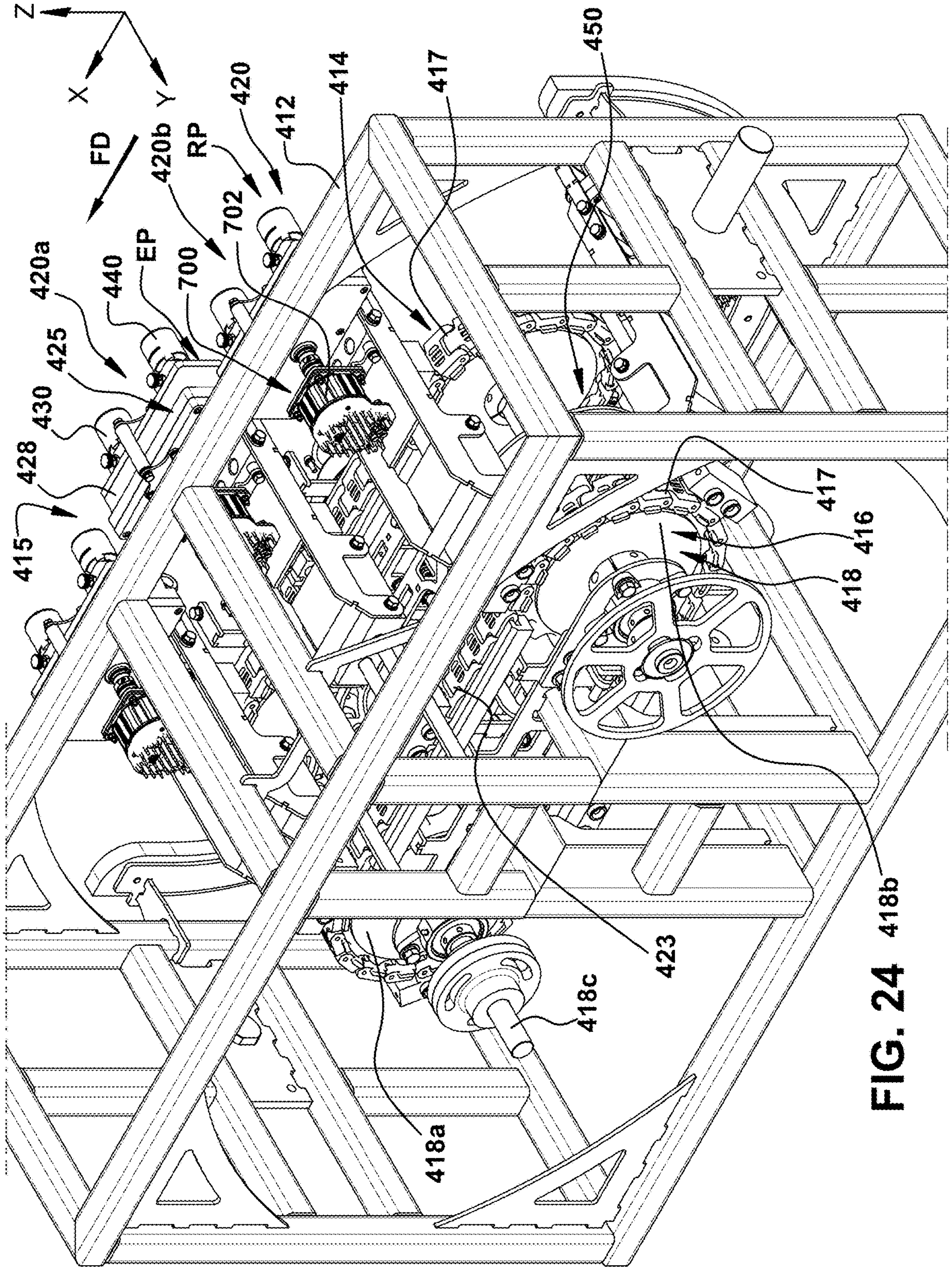
FIG. 24 is a schematic back perspective view of the first cutting module of FIG. 20.

In one example embodiment, the blade advancement distance BAD, as measured along the cutting head line of action LN1 is approximately four inches. That is the distance along the line of action LN1 between the retracted position RP and the engaged position EP (as viewed in side elevation, e.g., as viewed in FIGS. 18 & 22, is approximately four inches. The drive belt arrangement or assembly 416 continually moves or circulates the plurality of cutting heads 420 in a generally oval-shaped path of travel. As looking at the plurality of cutting heads 420 in a front view, for example, FIGS. 21 & 23, that is, looking at the cutting edges 437, 447 of the cutting blades 430, 440 of the first cutting head 420*a*, the plurality of cutting heads 420 are move or translated in a clockwise direction around the generally oval cam track slot 454. For example, in FIG. 23, the cutting head 420*a* moves through the blade parallel translation portion 456*b* of the two axis movement section 456 of the cam track slot 454, the cutting head 420*a* moves in the direction DBD as it moves across the upper section of the oval. With respect to the parallel translation portion 456*b*, the cam track slot 454 constrains the movement of the plurality of cutting heads 420 of the first cutting assembly 415 such that the cutting heads only move to the engaged position EP during a portion of the path of travel when the cam follower pin 426 of the cutting head is in the cam track slot two axis movement section 456. In all other portions of the cutting head path of travel, the cam track slot 454 constrains the movement of the cutting head to remain in the retracted position RP. That is, a linear extent of the cam track slot two axis movement section 456 of the cam track slot 454 (that is, the blade parallel translation portion 456*b*) defines an extent of the engagement distance ED1 of the cutting heads of the first cutting module 410 and the trolley travel velocity Vt and the engagement distance ED1 determines the aforementioned dwell time wherein the first and second cutting blades 430, 440 are in the engaged position EP to perform cutting operations.

Shackle Conveyor 110

In one example embodiment, the poultry processing apparatus 100 includes the shackle conveyor 110 including a plurality of trollies or trolley assemblies 200 driven for movement in the flow direction FD along an endless trolley track 130. Each trolley assembly or trolley of the set of trolley assemblies 200, for example, representative trolley 202, includes a trolley body 210, that rides along the trolley track 130, and a shackle, for example, representative shackle 302, which is rigidly affixed to and rides with the trolley body 210. The trolley track 130 defines a trolley ride surface 132, which, in turn, defines a trolley or shackle path of travel SPT for the set of trollies 200. Each trolley of the set of trollies 200, for example, representative trollies 202, 212, includes and supports a poultry wing holding shackle, for example, representative respective shackles 302, 312. That is, each trolley of the set of trollies 200 includes a poultry wing holding shackle. Thus, there is a one-to-one correspondence between a set of shackles 300, for example, representative shackles 302, 312, and the set of trollies 200, for example, representative respective trollies 202, 212. The set of trollies 200, in one example embodiment, are uniformly spaced along a longitudinal extent or circumference of the trolley track 130 by a trolley chain 150. The trolley chain 150 is driven at a predetermined, constant speed or trolley velocity Vt. In one exemplary embodiment, a distance between adjacent trollies of the set of trollies 200, as measures along a horizontal axis is six inches.

Figure 5:
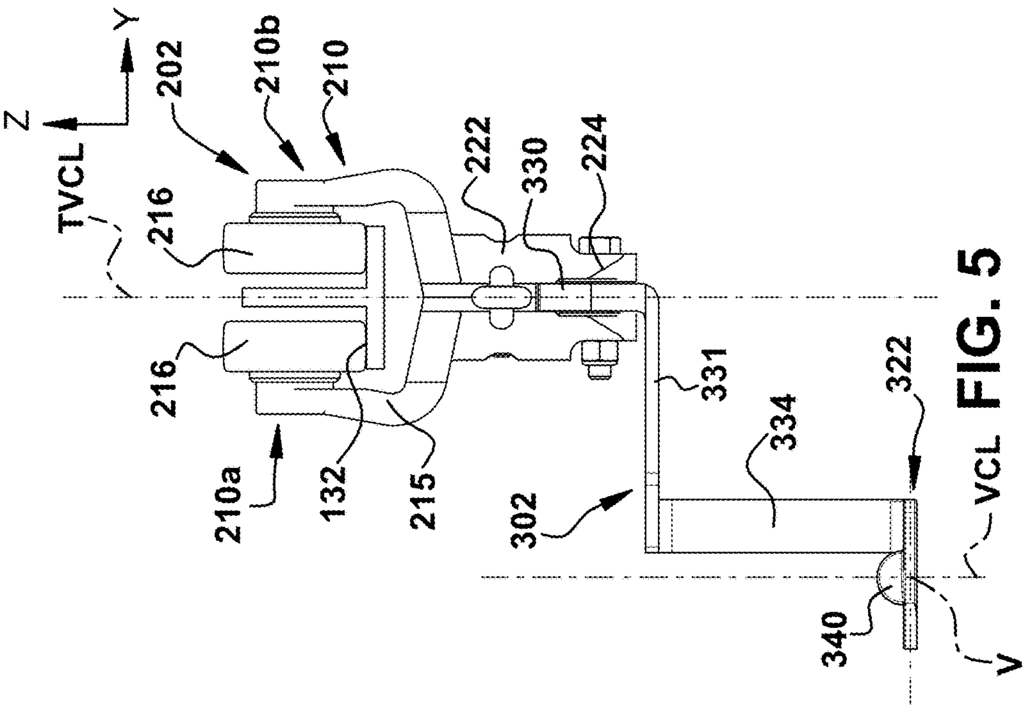
FIG. 5 is a schematic end view of the portion of the shackle conveyor of FIG. 3.

In one example embodiment, each trolley or trolley assembly, for example, representative trolley assembly 202, of the set of trollies 200 includes a trolley body 210 comprising two mating halves or pieces 210*a*, 210*b*. An upper portion of the trolley body 210 includes a Y-shaped configuration defining a trolley caster support 215. The arms of the trolley caster support 215 support rotatable trolley casters 216 which ride along the upwardly facing trolley ride surface 132 of the trolley track 130 of the shackle conveyor 110. A generally cylindrical lower portion of the trolley body 210 comprises a trolley bracket 220 which includes a trolley chain attachment portion 222 and a shackle attachment portion 224. Owing to the two-piece construction of the trolley body 210, the mating pieces 210*a*, 210*b* sandwich and secure the trolley chain 150 in the trolley chain attachment portion 222 when the two body pieces 210*a*, 210*b* are assembled. Similarly, the two body pieces 210*a*, 210*b* also sandwich an upper interface section 330 of the shackle 302 to affix the shackle 302 to the trolley body 210 when the two body pieces 210*a*, 210*b* are assembled. Advantageously, as best seen in FIG. 5, for ease of loading wings into the wing receiving opening 322 of its corresponding shackle 322, a vertical center line TVCL through the trolley body 210 of the trolley 202 is parallel to, but vertically offset from a vertical center line VCL through the wing receiving opening 322 of the attached shackle 302.

Providing motive power to the shackle conveyor 110 is a motor/gearbox arrangement 910. In one example, embodiment, the motor/gearbox arrangement 910 is positioned above a vertical axis of rotation of the poultry wing segmenter 900. Thus, the motor/gearbox arrangement 910 both rotates the poultry wing segmenter 900 and simultaneously drives the trolley chain 150 of the shackle conveyor 110, such that the rotation of the poultry wing segmenter 900 is in synchronization with longitudinal movement of the set of trolleys 200 along the trolley track 130 in the flow direction FD at the trolley velocity Vt. Obviously, if processing or packing equipment other than the poultry wing segmenter 900 were utilized with the poultry processing apparatus 100, a prime mover to drive the trolley chain 150 at the desired trolley velocity Vt would be required.

As explained above and as used herein, the trolley path of travel SPT for the set of trollies 200 is substantially parallel to but offset from the poultry carcass portion path of travel by the configuration of the shackles of the set of shackles 300. Because the paths of travel of the trollies, the shackles and the poultry carcasses/butterfly with wings portions are all parallel, the paths of travel will be referred to a single path of travel SPT, with the understanding that the respective paths of the trollies, shackles and poultry carcasses/butterfly with wings portions are offset or spaced apart, but are parallel. For example, the poultry carcass portion path of travel SPT can be viewed as being defined by the path of travel of the wing-receiving openings of the set of shackles 300, for example, wing-receiving openings 322, 332 of the representative adjacent pair of first and second shackles 302, 312 as the set of shackles 300 move with their associated set of trollies 200 along the trolley track 130. Thus, for purposes herein, the shackle path of travel and the poultry carcass path of travel can be considered as being a single path of travel SPT. Similarly, since each trolley, for example, trolley 202, includes a shackle, for example, shackle 302, for purposes herein, the trolley path of travel and the shackle path of travel can be considered as being a single path of travel SPT.

In the input section of the shackle conveyor 110, a butterfly portion 2002 is loaded into adjacent shackles 302, 304, as described above. In one typical use of the poultry processing apparatus 100 is in conjunction with one or more cone lines, for example, first and second cone lines 950, 960, which are positioned adjacent and parallel to the input section 112 of the shackle conveyor 110. For example, first cone line 950 is adjacent a first portion or section 114 of the input section 112, while the second cone line 960 is adjacent a second portion or section 116 of the input section 112. The cone lines 950, 960 process poultry carcasses, producing, among other products, the butterfly portions 2002. In such a use of the poultry processing apparatus 100, the wings 2010, 2020 of each of the butterfly portions 2002 are then loaded by cone line workers into respective wing-receiving openings of adjacent shackles of the set of shackles 300, for example, the wings 2010, 2020 are loaded or inserted into the wing-receiving openings 322, 332 of the adjacent shackles 302, 312.

To facilitate the loading of the wings of the butterfly portions into the shackles of the set of shackles, advantageously, in the first portion 114 of the input section 112 of the shackle conveyer 110 includes a first twisted section 134 of the trolley track 130 adjacent the first cone line 950 and the second portion 116 of the input section 112 of the shackle conveyor 110 includes a second twisted section 136 of the trolley track 130 adjacent the second cone line 960. In the twisted sections 134, 136, the trolley ride surface 132, which is otherwise substantially a horizontal ride surface, is angled with respect to horizontal such that as a trolley, for example, trollies 202, 204 of the set of trolleys 200, move along the twisted sections 134, 136 of the trolley track 130, the orientation of the trollies 202, 204 change such that vertical center lines VCL of the respective shackles 302, 304 of the trollies 202, 204 are pivoted away from vertical to facilitate insertion of the wings 2010, 2020 into the respective wing-receiving openings 322, 332 of the shackles 302, 304 by angling the shackles upwardly and toward the workers of the cone lines 950, 960.

Additionally, to permit ease of worker travel about the poultry processing apparatus 100, one or more portions of the conveyor trolley track 130, such as inclined portions 138, 140 may be inclined upwardly with respect to ground level. The conveyor track 130 will be laid out to fit within the desired confines and space considerations of an available plant or processing facility. For example, oval layout with long straight sides of the conveyor track 130 may be utilized if a long, rectangular building of appropriate length is being utilized for the poultry processing apparatus 100. However, in many instances, the interior dimensions of a plant or facility may require that a conveyor track 130 include an angled section as shown, for example, in FIG. 1 wherein the first input section of the shackle convey 110 is at right angles to the second processing section 118 of the shackle conveyor 110 extending past the first and second cutting modules 410, 460 and the third transfer portion 124 of the shackle conveyor 110 in the region of the poultry wing segmenter 900. At locations along the trolley track 130 where it is desired to effect an angular turn of the shackle conveyor 110, a trolley chain tensioner wheel 170 and/or idler wheels 172 are provided to interface with the trolley chain 150 and redirect the chain 150 along a new direction of the trolley track 130. A trolley chain tensioner 170 and a plurality of idler wheels 172 are depicted in the example embodiment of the poultry processing apparatus 100 of FIGS. 1 & 2. For ease of depiction and simplicity of the drawing figures, not all trollies of the set of trollies 200 are depicted in FIGS. 1 & 2, it being understood that, in reality, shackles would be spaced a predetermined distance apart, e.g., six inches apart on vertical center lines, along the entirety of the extent of the trolley chain 150 of the shackle conveyor 110. Similarly, much of the support frame 113 that is required to support the shackle conveyor 110 has been omitted from the drawing figures. It is understood that such a support frame would be required to support the trolley conveyor 110 along its extent, including support of the chain tensioner 170 and idler wheels 172.

Set of Shackles 300

Figure 4:
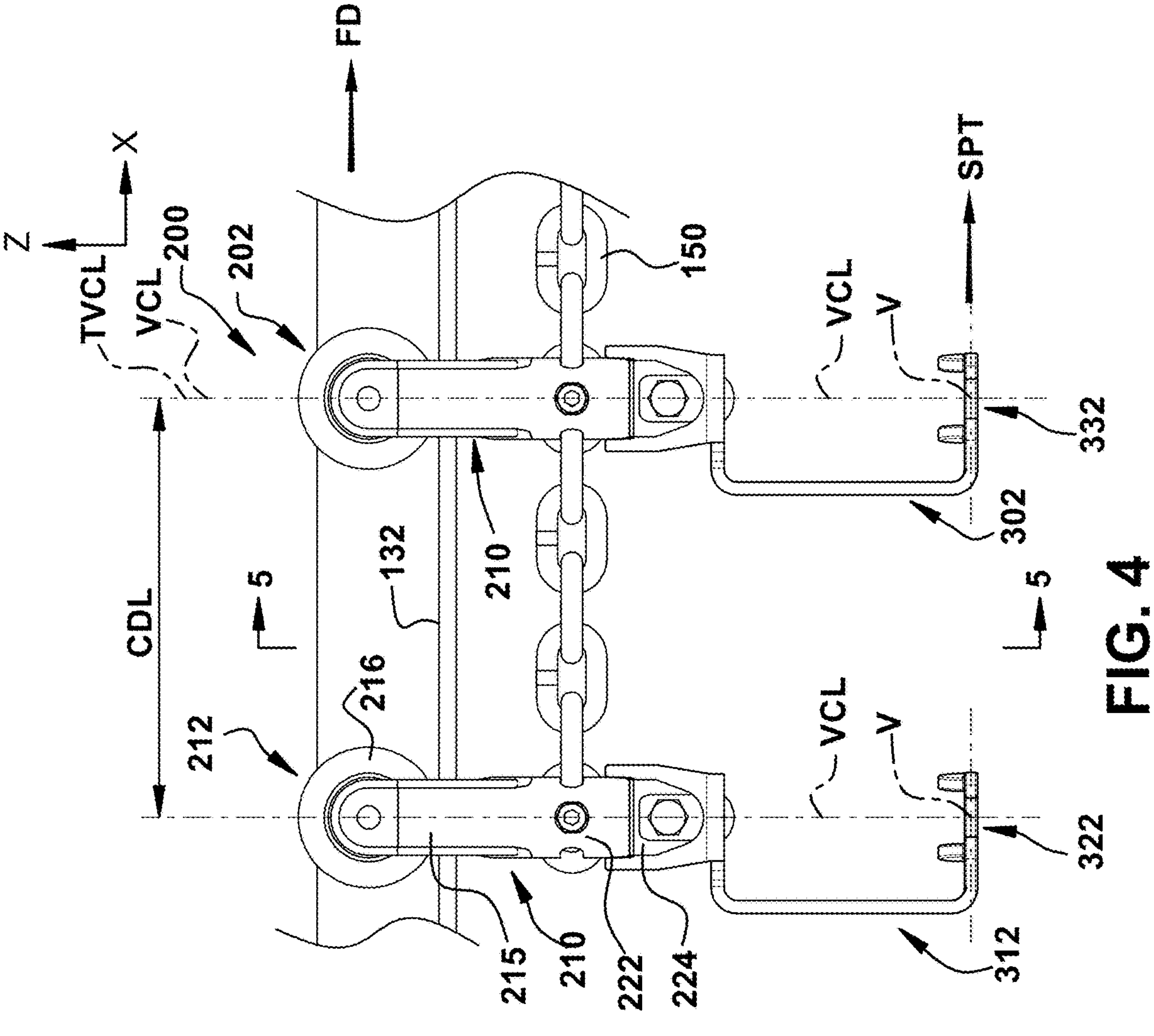
FIG. 4 is a schematic side elevation view of the portion of the shackle conveyor of FIG. 3.
Figure 6:
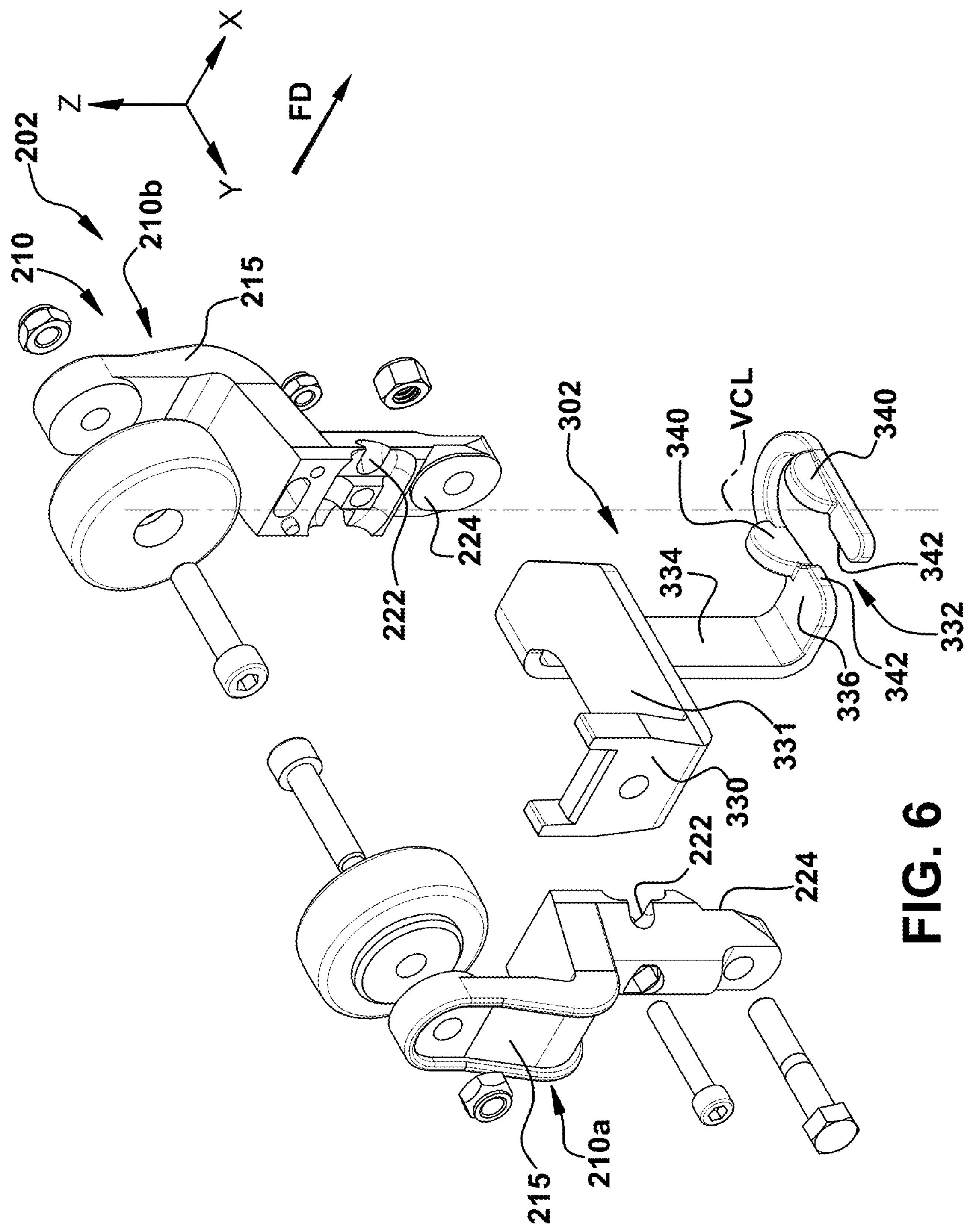
FIG. 6 is a schematic exploded front perspective view of a trolley or trolley assembly including the trolley body, trolley casters, and shackle.
Figure 8:
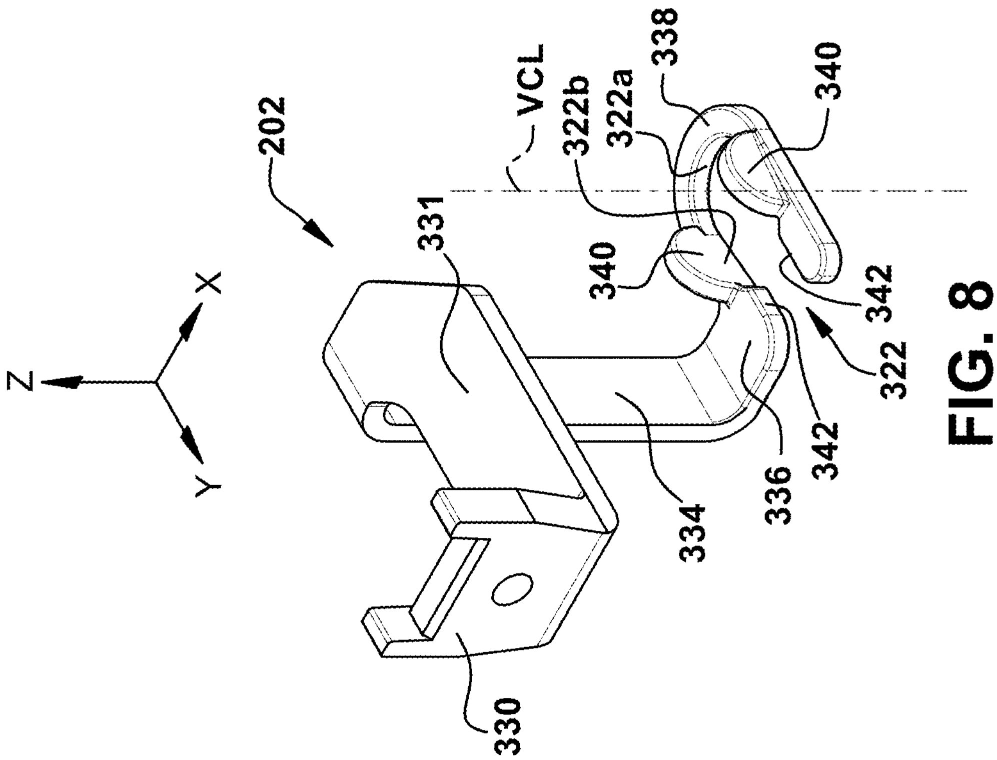
FIG. 8 is a schematic front elevation view of the shackle of FIG. 7.
Figure 7:
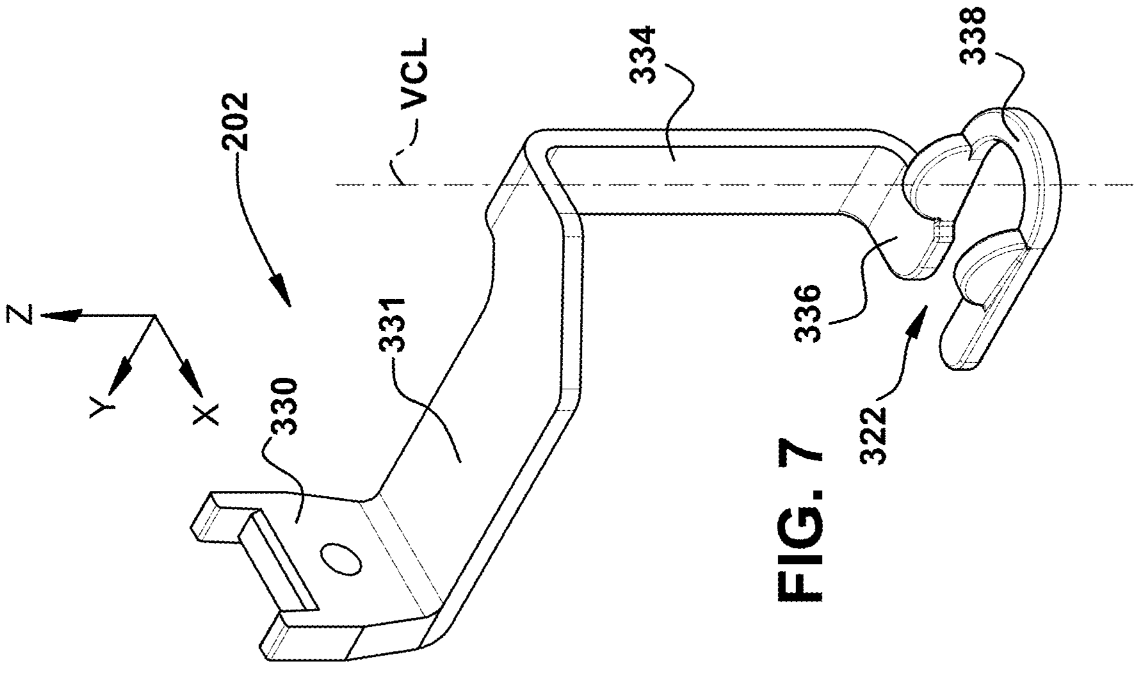
FIG. 7 is a schematic front perspective view of a shackle of a trolley.
Figure 9:
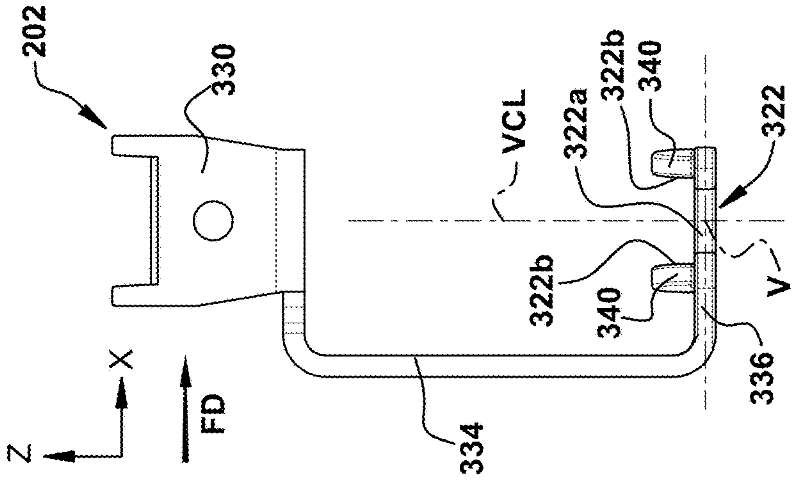
FIG. 9 is a schematic side elevation view of the shackle of FIG. 7.
Figure 10:
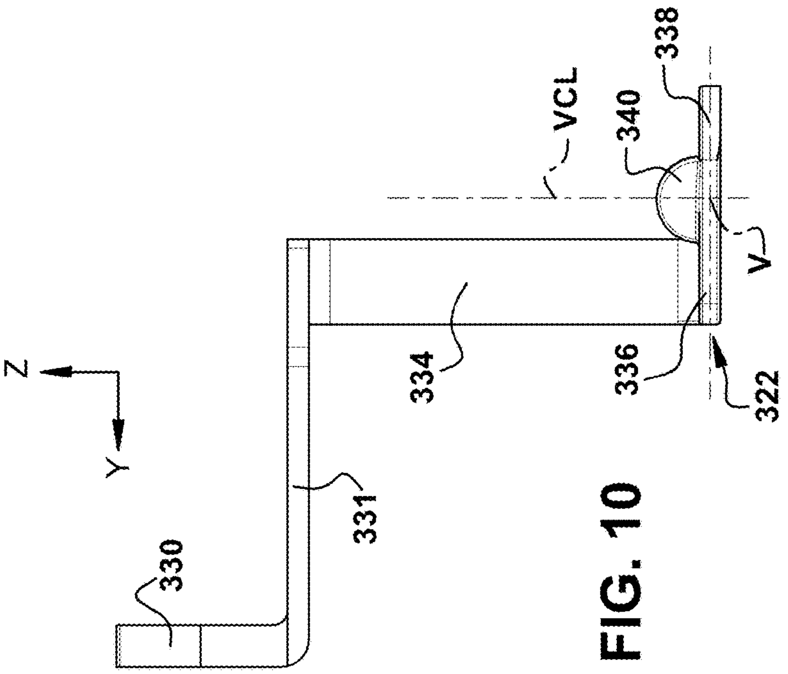
FIG. 10 is a schematic top plan view of the shackle of FIG. 7.
Figure 11:
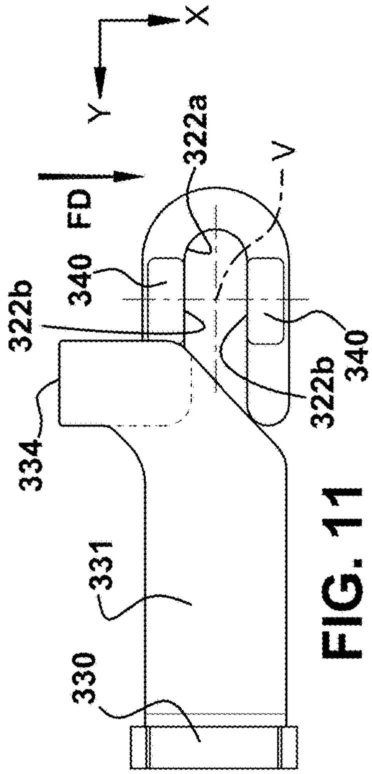
FIG. 11 is a schematic bottom plan view of the shackle of FIG. 7.
Figure 13:
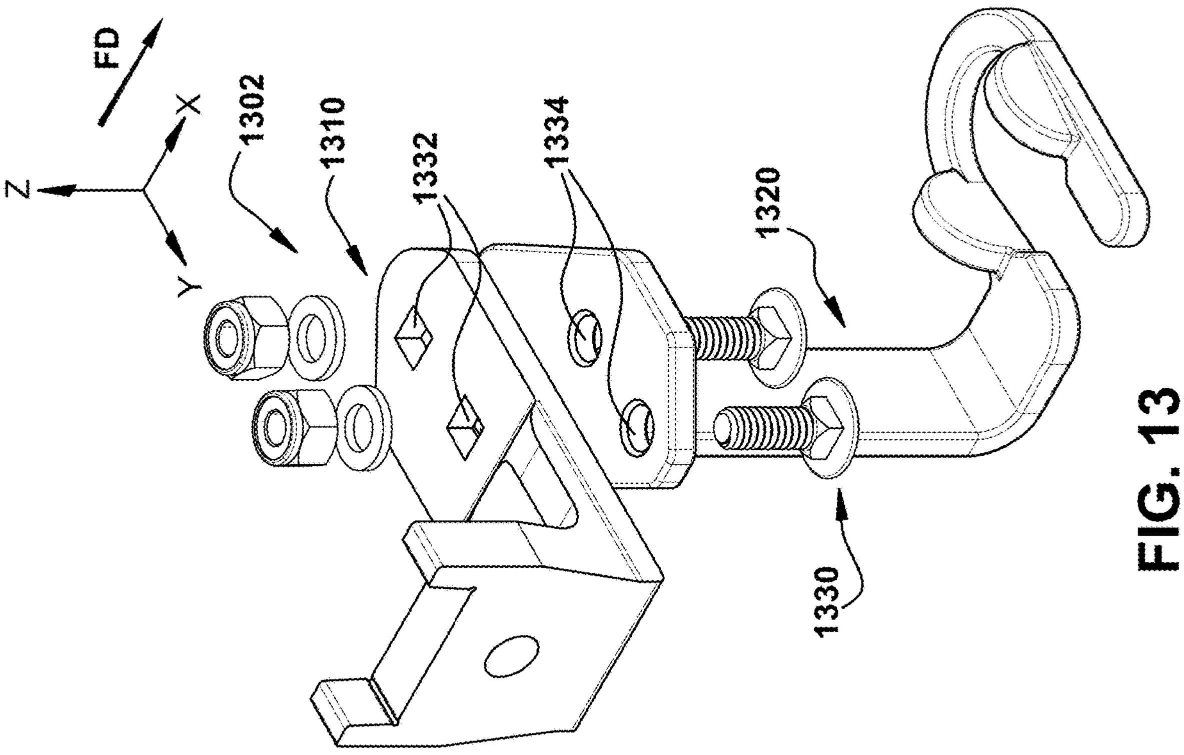
FIG. 13 is a schematic exploded front perspective view of the two-piece shackle of FIG. 12.
Figure 12:
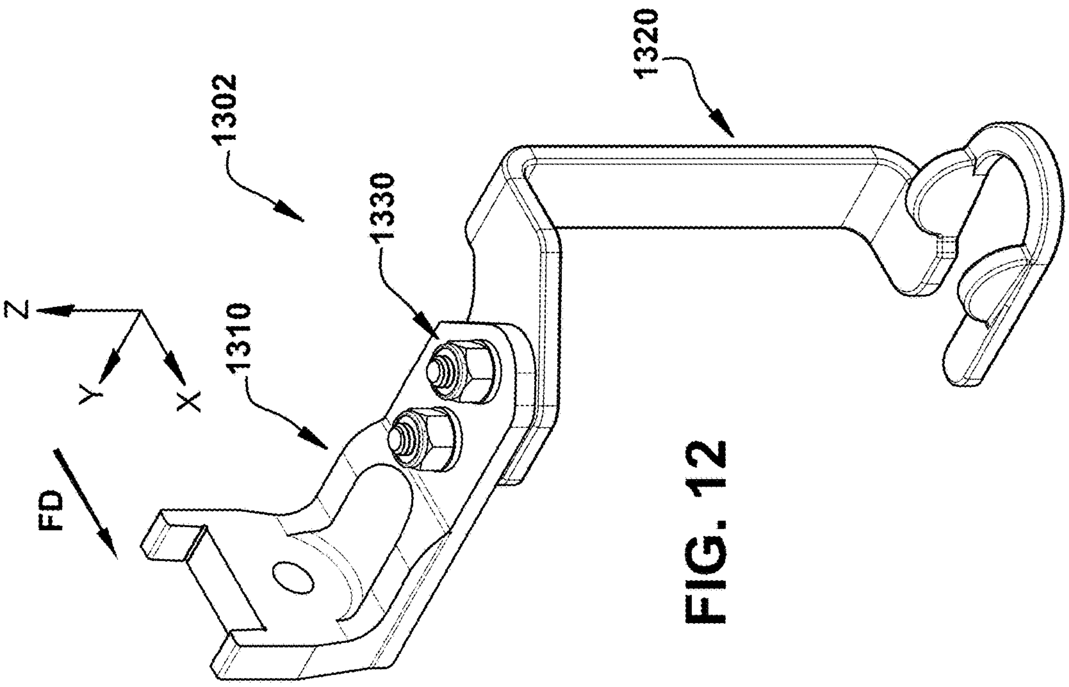
FIG. 12 is a schematic front perspective view of a second example shackle suitable for use with the poultry processing apparatus of FIG. 1, the shackle being of two-piece construction, including an interface portion piece and a body portion piece.
Figure 14:
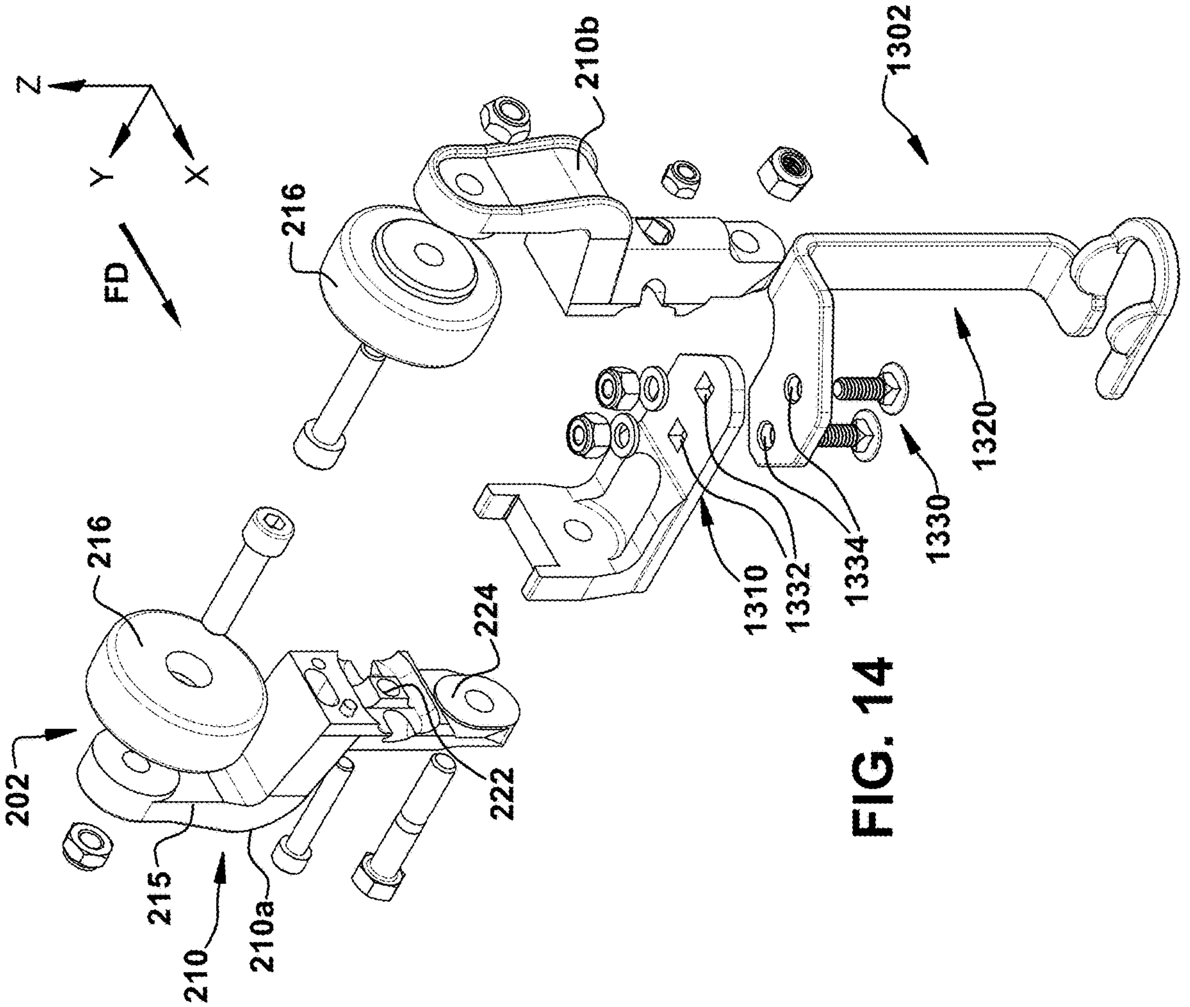
FIG. 14 is a schematic exploded front perspective view of a trolley or trolley assembly including the two-piece shackle of FIG. 12.
Figure 15:
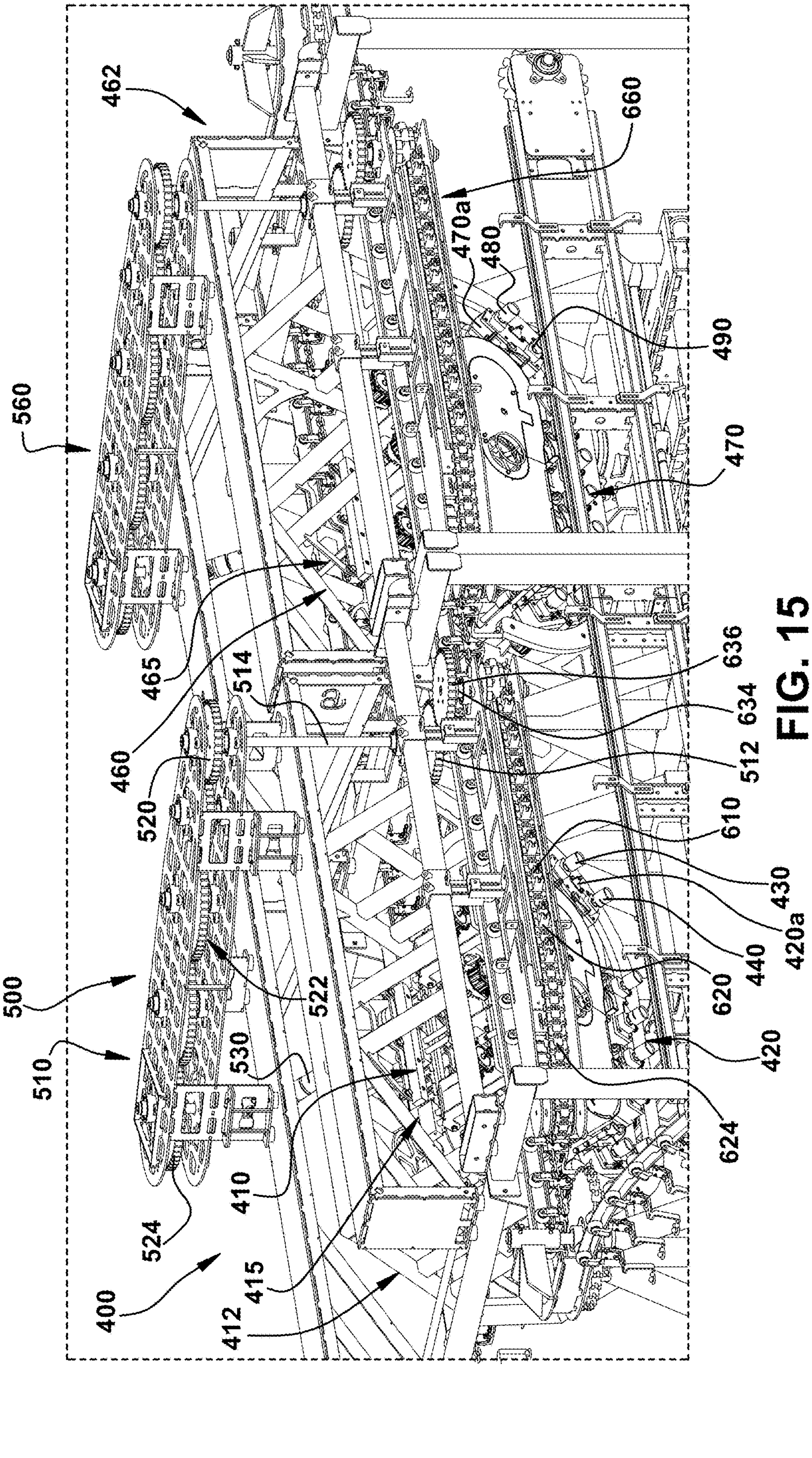
FIG. 15 is a schematic front perspective view of a portion of the poultry processing apparatus of FIG. 1 including a portion of the shackle conveyor and first and second cutting modules.
Figure 16:
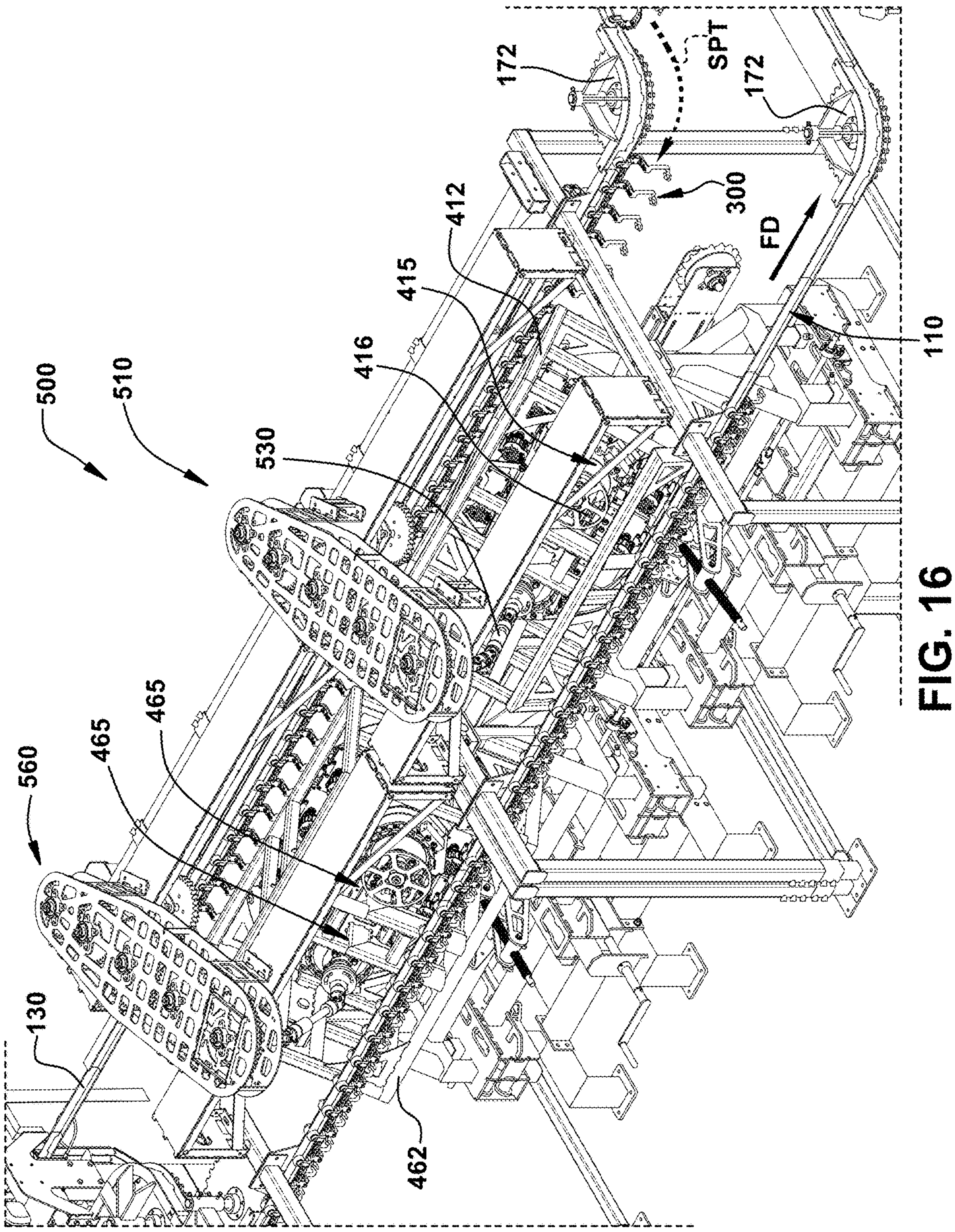
FIG. 16 is a schematic back perspective view of a portion of the poultry processing apparatus of FIG. 1 including a portion of the shackle conveyor and first and second cutting modules.
Figure 17:
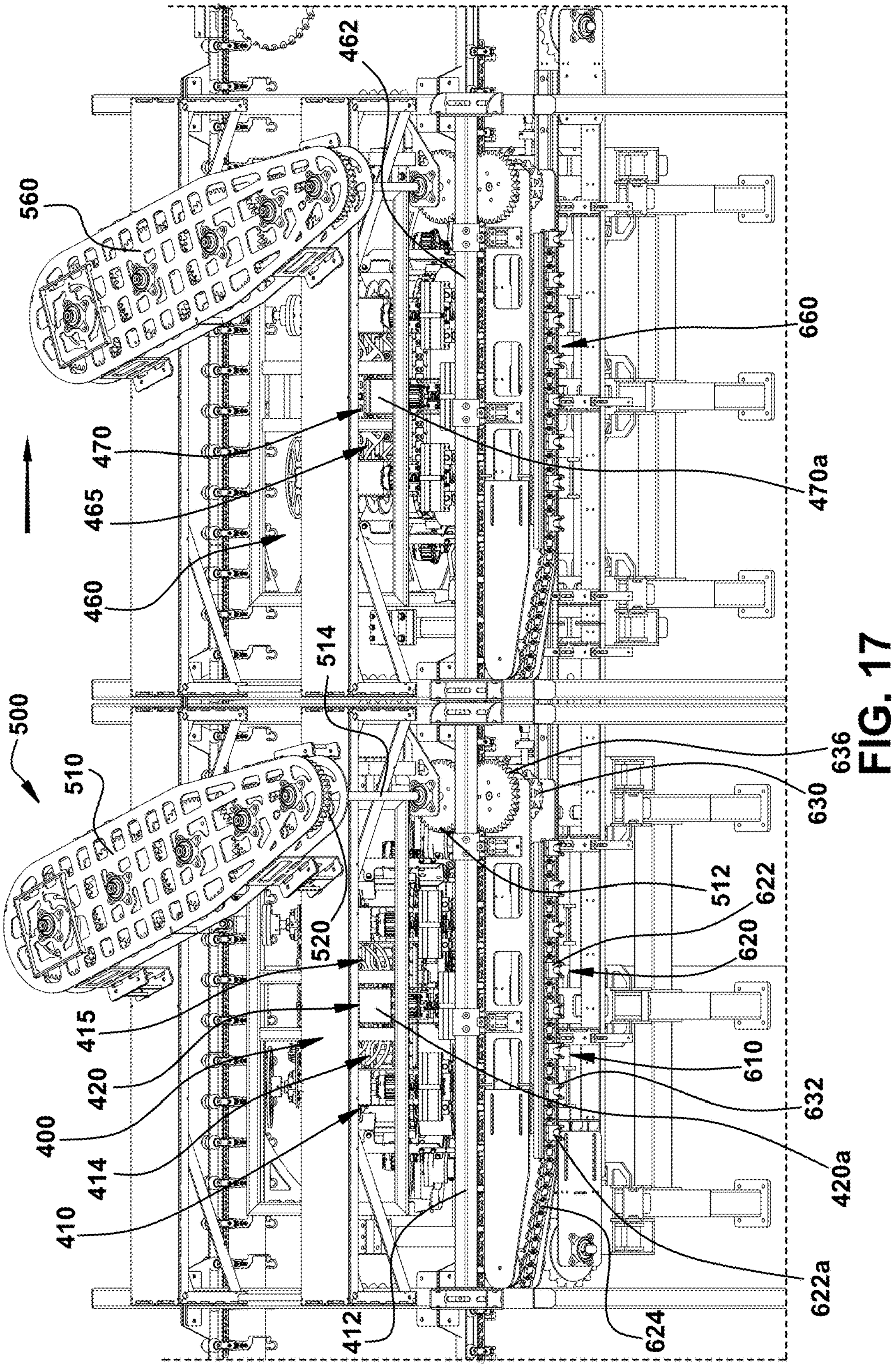
FIG. 17 is a schematic front perspective view of a portion of the poultry processing apparatus of FIG. 1 including a portion of the shackle conveyor and first and second cutting modules.

In one example embodiment, the set of shackles 300 comprises a set of one-piece shackles, for example, representative shackle 302, as schematically depicted in FIGS. 6-11. The shackle 302 is a part of and is affixed to a respective trolley of the set of trolleys 200, for example, representative trolley 202. In one example embodiment, the shackle 302 includes an interface portion 330 of the shackle 302 that is configured to be affixed to the shackle attachment portion 224 of the trolley 202. In essence since the trolley body 210 is, in one example embodiment, comprised to two mating halves or pieces, i.e., mating first and second body parts 210*a*, 210*b* of the trolley body 210, the interface portion 330 is sandwiched or secured between the mating first and second body parts 210*a*, 210 a in the region of the shackle attachment portion 224 of the trolley 202. The shackle 202 further includes a first horizontal offset section 331 extending from the interface portion 330. Extending downwardly from the first horizontal offset section 331 is a vertical drop section 334 of the shackle 302. The second horizontal offset section 336 extends from the vertical drop section 334 and forms a portion of a generally vertical interior wall 322*a* defining the generally U-shaped wing-receiving opening 322 of the shackle 302. Extending from the second horizontal offset section 336 is a generally U-shaped horizontal section 338 that includes a central opening defining a portion of the wing-receiving opening 322. The horizontal section 338 includes an interior wall that forms a portion of the vertical interior wall 322*a* defining the wing-receiving opening 322. Extending upwardly from the U-shaped horizontal section 338 are a pair of arcuate tabs or projections 340. Facing inner surfaces 322*b* (FIG. 8) of the arcuate projections 340 also form a portion of the vertical interior wall 322*a* defining the wing-receiving opening 322. The vertical wall portion defining the generally U-shaped wing-receiving opening 322 includes a narrowed entrance region 342 which aids in retaining the wing in the wing receiving opening 322. A vertical center line VCL of the shackle 302 extends through a vertex V (FIGS. 4 & 5) of the wing-receiving opening 322. The vertical center line VCL is parallel to and horizontally offset from the from the vertical drop section 334 of the shackle 302.

Advantageously, the narrowed entrance region 342, as noted above, enhances the wing retaining capability of the shackle 302. Additionally, the configuration of the shackle 302 includes the following features: a) the vertical drop section 334 is offset from the wing receiving opening 332 by the second horizontal offset section 336 which allows for easier loading of the wing 2010 into the wing-receiving opening 322 of the shackles 302; b) the two upwardly projecting tabs 340 of the shackle 302 aid in gripping the wing drumette 2014 (FIGS. 26 & 27) to hold the drumette and thereby the wing stationary during cutting operations to the wing by the first cutting blade 430 and allows the wing joint 2012 to tip upwardly from horizontal to thereby better present the wing joint 2012 to the cutting blade 430 of the cutting head 420*a* for the wing rounding cutting operation; and c) the back region of the wing receiving opening 322 of the shackle 302 is enlarged and tapered radially outwardly compared to the narrowed entrance region 342 which allows the drumette 2014 of the wing 2010 to be more securely seated in place in the wing-receiving opening 322.

In another example embodiment, the set of shackles 300 comprises a set of two-piece shackles, for example, representative shackle 1302, as schematically depicted in FIGS. 12-15. The two-piece shackle 1302 includes a upper portion 1310 which includes what was referred to with respect to the discussion of the one-piece shackle 302 as the interface portion 330 and a part of the first horizontal offset section 331 of the one-piece shackle 302. The remainder of the two-piece shackle 1302 is the lower portion 1320. Again, with reference to the discussion of the one-piece shackle 302 above, the lower portion 1320 of the two-piece shackle 1302 includes part of the first horizontal offset section 331, the vertical drop section 334, the second horizontal offset section 336, and the generally U-shaped horizontal section 338, which partially defines the wing receiving opening 322. The upper and lower portions 1210, 1320 of the two-piece shackle are secured using a plurality of fasteners 1330 which pass through aligned openings 1332, 1334 of the upper and lower portions 1210, 1220. Advantageously, the two-piece shackle configuration allows for changing the lower portion 1320 of the shackles if the characteristics of the poultry portions being processed so require. For example, if a larger or smaller poultry portion is being processed, the lower portions of the two-piece shackles could be replaced by lower portions having larger or smaller wing receiving openings. It should be appreciated, of course, that the poultry processing apparatus 100 may be used with a combination of one-piece and two-piece shackles, if desired.

Cutting Modules 400

The poultry processing apparatus 100 further includes the set of cutting modules 400 positioned adjacent the shackle conveyor 110. In one example embodiment, the set of cutting modules 400 includes first and second cutting modules 410, 460, however, it should be recognized that the number of cutting modules in the set of cutting modules 400 may be one, two, or three or more modules depending on the cutting tasks to be performed and size and other characteristics of the poultry carcasses or meat products to be processed. That is, the concepts of the poultry processing apparatus 100 are not limited to processing poultry carcasses, but are applicable to any number of food products suitable to be hung in one or more shackles and wherein precise cutting operations are to be performed. The cutting operation precision afforded by a predetermined engagement distance ED1 and a positive dwell time of the set of cutting modules 400 would be advantageous in a range of meat/poultry/seafood and other food product cutting operations.

In one example embodiment, the cutting blades of the first cutting module 410 perform, in one example embodiment, an initial or pre-cut operation step of partially cutting the two poultry wings 2010, 2020 at the wing joints 2012, 2022 from the breast portion 2002, while cutting blades of the second cutting module 460 perform a final cut to complete the cutting operation by severing the two poultry wings 2010, 2020 from the poultry carcass 2000. Utilizing such a two-step cutting operation is advantageous since, after the partial cut, a weight of the poultry breast tends to pull the breast meat away from the wing, providing additional clearance in the region of the wing joints 2012, 2022 for the final cut. However, it should be recognized that severing of the two poultry wings 2010, 2020 from the breast portion 2002 could be done in one cutting operation and, thus, the poultry processing apparatus 100 of the present disclosure could function with a single cutting module, for example, the cutting module 410 or the cutting module 460. Nonetheless, utilization of the two-step cutting operation will likely result in improved yield, i.e., less of the higher value breast meat is left on the severed wings 2010, 2020. Another advantage of pre-cut and final cut cutting modules 410, 460 is redundancy. That is, if the final cut module 460 is inoperative, slight adjustments may be made to the pre-cut module 410 to allow it to accomplish the entirety of the cutting operation. Typically, the pre-cut module 410 will include slightly smaller diameter rotary cutting blades 430, 440, thus, the adjustments would include replacing the smaller diameter rotary cutting blades 430, 440 of the first cutting module 410 with the larger diameter cutting blades 480, 490 of the second cutting module 460.

In one example embodiment, the first and second cutting modules 410, 460 are substantially identical in configuration and operation and, for brevity only the cutting module 410 will be described in detail. Further, as explained above, a single cutting module, for example, the first cutting module 410 may be used for the entirety of wing severing operation. Thus, the discussion hereafter will focus on the first cutting module 410, with the understanding that if both the first and second cutting modules 410, 460 are utilized in the poultry processing apparatus 100, the first cutting module 410 would perform the pre-cut cutting operation, while the second cutting module 460 would perform the final cut cutting operation to thereby sever the pair of wings 2010, 2020 from the breast portion 2030 of the butterfly 2002. The first cutting module 410, in one example embodiment, includes a first cutting module frame or cage 412 that supports a first cutting assembly 415, while the second cutting module 460, in one example embodiment, includes a second cutting module frame or cage 462 that support a second cutting assembly 465.

As noted above, the first cutting module 410 includes the cutting assembly 415 having the plurality of cutting heads 420, each of which includes first and second cutting blades 430, 440, and a dual action cutting head translation assembly or translation mechanism 414 for: a) sequentially moving the cutting heads 420 along a line of action LN1 transverse to the trolley path of travel SPT between a retracted position RP and an engaged position EP; and b) when a cutting head, for example, representative cutting head **420*a*, is in the engaged position EP, moving the cutting head 420*a* along the trolley path of travel 420*a* in synchronization with the trolley velocity Vt over a first engagement distance ED1. In one example embodiment, the translation mechanism 414 includes: a) a drive belt arrangement 416 which supports and moves or translates the plurality of cutting heads 420 of the first cutting assembly 415; and b) a linear cam mechanism 450 which sequentially moving the cutting heads 420 along the line of action LN1 transverse to the trolley path of travel SPT between the retracted position RP and the engaged position EP. The drive belt arrangement 416 includes the spaced-apart pair of synchronously driven, endless, linked drive belts 417 which support the plurality of cutting heads 420. The pair of drive belts 417 are driven at the trolley velocity Vt by a sprocket assembly 418 on which they are mounted. The sprocket assembly 418 includes a driven sprocket 418*a*, which rotates the drive belts 416 about an oval path of travel and an idler sprocket 418*b*. The driven sprocket 418*a* of the sprocket assembly 418, in turn, is driven at a predetermined angular velocity by a conveyor/gear drive train arrangement 500. As explained below, the conveyor/gear drive train arrangement 500 is itself driven by the movement of the set of trollies 200 along the trolley track 130 and thus advantageously rotate the driven sprocket 418*a* at an angular velocity that, in turn, drives the drive belts 416 at the same horizontal velocity as a velocity Vt of the trollies of the set of trollies 200 of the shackle conveyor 110**.

Uniformly spaced and bridging the drive belts 417 are the plurality of cutting heads 420. In one example embodiment, the number of cutting heads of the plurality of cutting heads 420 is seven, uniformly spaced cutting heads, for example, representative cutting head **420*a*, which will for convenience be referred to herein as the first cutting head 420***a*, recognizing that the other six cutting heads of the plurality of cutting heads 420 are similarly configured. Each cutting head, for example, representative cutting head 420*a* includes a mounting portion 422 that is affixed to and spans the pair of drive belts 417 and a translation portion 425. The translation portion 425 of the cutting head 420*a* that moves along a blade advancement/retraction direction or line of action LN1 that, when viewed in top plan view, is orthogonal to the path of travel SPT of the butterfly portions 2002, as suspended in the adjacent shackles 302, 312 of the shackle conveyor 110. The movement of the translation portion 425 along the blade advancement/retraction direction or line of action LN1 permits the first and second cutting blades 430, 440 of the translation portion 425 of the cutting head 420*a* engage the wing joints 2012, 2022 and thereby perform the desired wing cutting operation. That is, if a single cutting module (first cutting module 110) is being utilized, the desired wing cutting operation for the module would be to sever the poultry wings 2010 from the breast portion 2030. Alternately, if both the first and second cutting modules 410, 460 are being utilized, the desired wing cutting operation would be to perform the pre-cut cutting operation.

Figure 25:
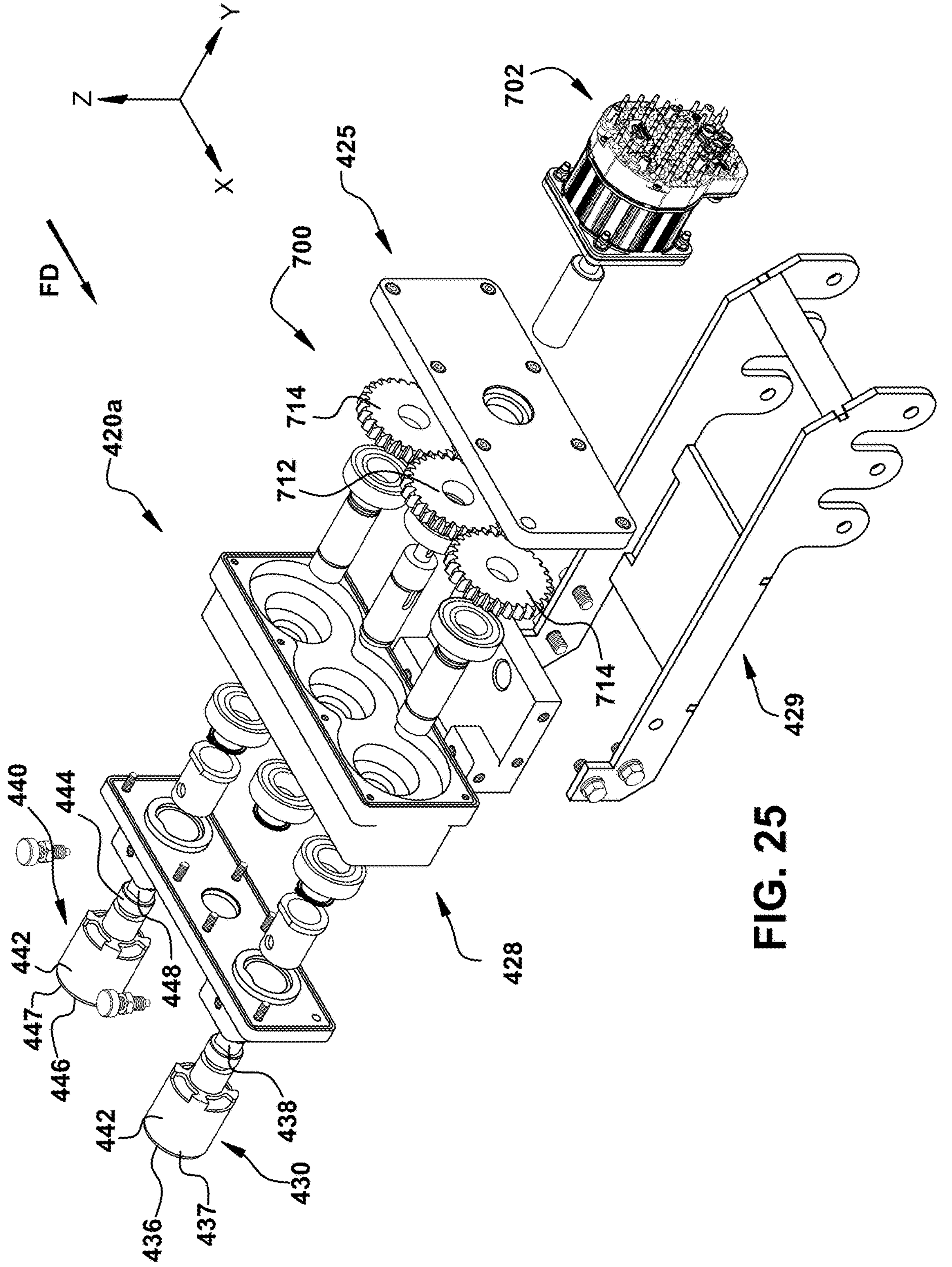
FIG. 25 is a schematic exploded back perspective view of a cutting head of the first cutting module.

The mounting portion 422 of the cutting head 420*a* includes first and second belt attachment members 423 that are attached to respective links of the pair of drive belts 417, while a slide rod 424 extends between the two belt attachment members 423. The translation portion 425 of the first cutting head 420*a* moves or translates along the slide rod 424 along the cutting blade or cutting head line of action LN1. In the engaged position EP of the cutting head 420*a*, the first and second cutting blades 430, 440 engage the poultry carcass portion 2000 in the region of the wing joints 2012, 2022 and in the retracted position RP of the cutting head 420*a*, the first and second cutting blades 430, 440 are spaced from the poultry carcass portion 2000. The translation portion 425 of the first cutting head 420*a* additionally includes a cam follower pin 426. The cam follower pin 426 rides along a cam track slot 454 of a linear cam mechanism 450 of the first cutting assembly 415 of the first cutting module 410, as explained below. The cutting blade housing 426 is laterally offset (in the direction of the line of action LN1) from the translation portion 425 by a set of parallel arms 429 (FIG. 25) that couples the translation portion 425 to the blade housing 428.

Allowing for the translation of the cutting head 420*a* (and the first and second cutting blades 430, 440) along the slide rod 424 in the blade line of action direction LN1 between the retracted and engaged positions RP, EP, in one example embodiment, is the linear cam mechanism 450 which is disposed between the pair of spaced-apart drive belts 417. The linear cam mechanism 450 includes a linear closed cam track 452 defining the cam slot 454. The cam slot 454 includes the two axis movement section 456. As the drive belts 417 move along their path of travel, the cam follower pin 426 of the translation portion 425 of the first cutting head 420*a* is constrained to move along the cam track slot 454. As explained above, when the cam follower pin 426 moves through the two axis movement section 456 of the cam slot 454: a) in the blade advancement portion or section 456*a*, the cutting head 420*a* and first and second blades 430, 440 move to the engaged position EP, that is, the first and second cutting blades 430, 440 are in position to intersect and cut the wing joints 2012, 2022 of the wings 2010, 2012 of the butterfly portion 2002; and b) in the blade parallel translation portion or section 456*b*, the cutting head 420*a* and the first and second cutting blades 430, 440 move at the travel velocity Vt of the shackles 302, 312 for the engagement distance ED1; and c) in the blade retraction portion or section 456*c*, the cutting head 420*a* and first and second cutting blades 430, 440 move to the retracted position RP. It should be recognized that the drive belt arrangement 416 and linear cam mechanism 450 represent only one way of achieving the desired line of action LN1 and engagement distance ED1 movement of the first and second cutting blades 430, 440 of the cutting head 420*a* to make the perform the desired cutting operations during a predetermined dwell time. Alternately, as would be understood by one of skill in the art, the desired blade movement could be achieved by, for example, a linear actuator system or a robotic arm mechanism and such configurations are within the scope of the poultry processing apparatus 100 of the present disclosure.

The first and second cutting modules 410, 460 advantageously have two degrees of travel movement or two degrees of freedom. First, each cutting head, for example, representative cutting heads 420*a*, 470*a* of the cutting assemblies 415, 465 includes a spaced apart pair of power driven or power operated cutting blades, for example, first and second cutting blade 430, 440 of the cutting assembly 415 and cutting blades 480, 490 of the cutting assembly 465. In one example embodiment, the first cutting module 410 includes first and second rotary cutting blades 420, 430. As previously noted, the first and second rotary cutting blades 420, 430 and the cutting head 420*a* have a line of action LN1 that is transverse to the trolley path of travel SPT. In a retracted position RP, the first and second rotary cutting blades 420, 430 are spaced from the first and second shackles 302, 312 and from the butterfly 2000 suspended therebetween. By contrast, in an engaged position EP, the first and second rotary cutting blades 420, 430 advance toward and intersect a shackle path of travel SPT to thereby engage and cut around the first and second wing joints 2012, 2022 to accomplish the wing rounding function, thereby severing the first and second wings 2010, 2020 from the breast portion 2030.

Furthermore, as noted above, to facilitate precise and accurate cuts by the first and second rotary cutting blades 420, 430, advantageously the first cutting module 410 includes an indexing or translation mechanism 414 such that the cutting assembly 415 and the plurality of cutting heads 420 of the first cutting module 410 moves in parallel synchronization (at the trolley velocity Vt) with the first and second shackles 302, 312 so that the first and second rotary cutting blades 420, 430 engage the butterfly 2000 for a predetermined dwell time, which, of course, given the trolley velocity Vt, corresponds to a predetermined engagement distance ED. The cutting module 410 of the present disclosure advantageously provides both: a) movement of the first and second rotary cutting blades 420, 430 along the line of action LN1 transverse to the trolley path of travel SPT to the engaged position EP to engage and cut the wings 2010, 2020 of the butterfly portion 2002; and b) movement of the first and second rotary cutting blades 420, 430 along the shackle path of travel SPT (or along the trolley path of travel SPT) maintaining cutting operations in the engage position EP for a desired engagement distance ED1. That is, cutting engagement or dwell time is advantageously increased by virtue of the translation of the first cutting assembly 415 (and, of course, the translation of the first and second rotary cutting blades 420, 430 which move with the first cutting assembly 410) along the shackle path of travel SPT by the indexing or translation mechanism 414 in synchronization with the trolley travel velocity Vt. The increased dwell time and engagement distance ED1 provided by translation of the first cutting assembly 4115 along the shackle path of travel SPT provides for precise and accurate cuts when performing the poultry wing rounding function with the first cutting module 410.

Cutting Blades 430, 440

The wing cutting/wing rounding operations are performed by first and second cutting members. In one example embodiment, the first and second cutting members are power driven, rotary knife blades. The first cutting assembly 415, as explained previously, includes the plurality of cutting heads 420, each of which includes a pair of spaced apart power driven, rotary knife blades. Looking at representative cutting head 420*a*, the power driven, rotary knife blades of the first cutting head 420*a* of the first cutting assembly 415 are continuously driven by a cutting blade drive arrangement or assembly 700 including, in one example embodiment, a DC motor 702. The cutting assembly 415 includes a slip ring electrical connection to permit continuous power to be furnished to the DC motor 702 of the drive arrangement 700. A geared belt 540 is provided and is driven by the shaft 418*c* of the driven sprocket 418*a* of the drive sprocket assembly 418 to time the slip ring electrical connection with movement of the plurality of cutting heads 420. The motor 700 drives the first and second cutting blades 430, 440 via a blade drive gear assembly 710. The blade drive gear assembly 710 includes a central gear 712 coupled to an output shaft of the motor 702. The rotating central gear 712, in turn, drives two flanking gears 714.

In one example embodiment, the first and second cutting blades 430, 440 each include cylindrical bodies 432, 442 and rearwardly extending shafts 434, 444. At distal ends 436, 446 of the cylindrical bodies 432, 442 are respective, substantially circular cutting edges 437, 447 which engage the wings joints 2012, 2022 of the wings 2010, 2020 of the poultry carcass 2000 and perform the cutting/wing rounding operations when the cutting head 420*a* is in the engaged position EP. Proximal ends 438, 448 of the rearwardly extending shafts 434, 444 are coupled to and rotate with the respective flanking gears 714, 716 of the drive arrangement 700 to thereby rotate the first and second cutting blades 430, 440 about their respective axes of rotation. It should be noted that the poultry processing apparatus 100 of the present disclosure contemplates other knife cutting configurations, for example, fixed cutting blades, water jet cutting mechanisms, etc.

Conveyor/Gear Drive Train Arrangement 500

The conveyor/gear drive train arrangement 500 advantageously couples the shackle conveyor 110 to the drive belt arrangement or assembly 416 of the first cutting module 420*a* to insure that the linear velocity of the pair of spaced apart drive belts 417 is synchronized with the trolley linear travel velocity Vt. Each cutting module 410, 460 has a substantially identical arrangement. The description herein will focus on the first cutting module 410. The conveyor/gear drive train arrangement 500 for the first cutting module 410 includes a first gear drive train 510 and a first cutting module power and timing conveyor 610, while the arrangement 500 for the second cutting module 460 includes a second gear drive train 560 and a second cutting module power and timing conveyor 660. The description herein will focus on the arrangement 500 of the first cutting module 410.

In one example embodiment, the first cutting module power and timing conveyor 610 includes a conveyor belt 624 that supports a plurality of uniformly spaced apart brackets or holders 620, for example, adjacent brackets 622, 632. Each of the brackets, for example, representative bracket 622, includes a horizontally oriented, arcuate opening 622*a*, that is sized to receive a generally cylindrical trolley bracket 220 of the trolley body 210 of a trolley or trolley assembly, for example, representative trolley assembly 202 of the plurality of trollies 200. Adjacent brackets or holders, for example, representative brackets 622, 632, of the plurality of brackets 620 are spaced apart by the same distance as the distance between vertical center lines VCL of adjacent shackles 302, 312 of the plurality of shackles 300. In one example embodiment, adjacent shackles 302, 312 are spaced apart by six inches and, accordingly, each pair of adjacent brackets of the plurality of brackets 620, for example, representative adjacent brackets 622, 632, are similarly spaced apart by six inches, as measured horizontally. In one example embodiment, a horizontal length or extent of the first cutting module power and timing conveyor 610 is sufficient such that, at any given time, eight brackets are engaged with and receive respective trolley brackets 220.

Movement of the set of trollies 200 of the shackle conveyor 110 at a trolley velocity Vt, therefore, causes horizontal movement of the conveyor belt 624 of the first bracket conveyor 610 at a belt velocity corresponding to the trolley velocity Vt. Given the belt velocity, a horizontally oriented sprocket 630 at a downstream end of the conveyor belt 624 rotates at an angular velocity. A vertical shaft 634 (FIG. 15) affixed to and extending through an axis of rotation of the sprocket includes a drive gear 636 near an upper end of the vertical shaft 634. The drive gear 636 of the first cutting module power and timing conveyor 610 meshes with and rotationally drives a driven gear 512 of the first gear drive train 510. The driven gear 512 is mounted near a bottom portion of a vertical shaft 514 of the drive train 510. Mounted at an upper portion of the vertical shaft 514 is a first drive train gear 520. The first drive train gear 520 rotatably drives a set of drive train gears 522. A final gear 524 in the set of drive train gears 522 drives a slip yoke drive shaft 530. The slip yoke drive shaft 530 is coupled between and rotated by the final gear 524. The slip yoke drive shaft 530, in turn, rotatably drives a shaft 418*c* extending from the driven sprocket 418*a* of drive sprocket assembly 418 of drive belt arrangement 416 of cutting head translation mechanism 414 of first cutting module 420*a* to drive the pair of spaced apart, linked drive belts 417 at the appropriate horizontal speed of Vt. That is, the slip yoke drive shaft 530 connects to a shaft 418*c* extending from the driven sprocket 418*a* of the drive sprocket assembly 418 of the drive belt arrangement 416 thereby driving the pair of spaced apart belts 417 at the desired horizontal velocity Vt.

Method of Poultry Processing 1000

The present disclosure also relates to a method of processing poultry 1000 utilizing the poultry processing apparatus 100. In one example embodiment, the poultry processing method 1000 includes the following steps relating to the processing of a single poultry carcass portion 2000, it being understood that the poultry processing apparatus 100 will sequentially process many, many poultry carcass portions during a work shift, as the shackle conveyer 110 will continuously move at the trolley velocity Vt, thus, a given shackle, for example, shackle 302 will continue to circulate around the endless loop of the conveyor trolley track 130 numerous times during the course of a work shift. When processing is completed, the severed wings 2010, 2020 are either removed from the pair shackles 302, 312 in the third transfer section 124 of the shackle conveyor 110 either manually or automatically, e.g., removed from the shackles by the poultry wing segmenter 900 where the severed wings 2010, 2020 are further cut into drumette 2014, flat 2016 and tip 2018 portions by the segmenter 900. The now empty shackles 302, 312 continue to move in the flow direction FD along the endless trolley track 130 and ultimately arrive back at the first input section 112 of the conveyor 110. The empty adjacent shackles 302, 312 will then be in position to receive respective wings of a new poultry carcass. The adjacent shackles 302, 312 will be paired again to support a new poultry carcass 2000. That is, if shackles 302, 312 are considered by position on the conveyor 110 as shackle nos. 9 and 10, respectively, in any given circulation or circumnavigation of the endless loop of the trolley track 130, shackle no. 9 will be paired with shackle no. 10 to support a poultry carcass portion 2000. In a configuration or arrangement of the shackle conveyor 110 where, for example, sensors and/or detectors are utilized and each shackle may be assigned a unique identifier or ID and wherein that ID indicates, among other things, that a given shackle, for example, shackle 302 is a leading shackle (or a trailing shackle) in an identified set of adjacent shackles 302, 312, then, in such a configuration, the shackle 302 would always be paired with shackle 312 and would be designated as the leading shackle in that pairing of shackles.

In one example embodiment, the steps of the method 1000 include, at step 1010, providing a shackle conveyor 110 including a set of trolleys 200 driven to move at a trolley velocity Vt along a trolley track 130, the trolley track 130 including a trolley ride surface 130 which defines the trolley path of travel SPT. Each trolley, for example, representative trolley 202 of the set of trolleys 200 supporting a shackle, for example, representative shackle 302 of a set of shackles 300, for movement with the trolley 202 along the trolley track 130. Each shackle 302 having a wing-receiving opening 322 centered about a vertical center line VCL of the shackle 302, the vertical center line VCL approximately passes through a vertex V of the wing-receiving opening 322. The set of trolleys 200 are uniformly spaced along the trolley path of travel SPT such that there is a predetermined distance between vertical center lines VCL of the respective first and second shackles, for example, representative shackles 302, 312, of a pair of adjacent trolleys 202, 212 of the set of trolleys 200. Each shackle of the respective adjacent first and second shackles 302, 312 of the pair of adjacent trolleys 202, 212 receiving a poultry wing in the wing-receiving opening 322, 332, for example, respective poultry wings 2010, 2020 of a poultry carcass portion 2000, for example, representative butterfly portion 2002, in the wing-receiving openings, for example, respective wing-receiving openings 322, 332, of the shackles 302, 312 to thereby support the poultry carcass portion 2000 for movement along the shackle conveyor 110 in the flow direction FD along the shackle path of travel SPT. That is, the poultry carcass portion 2000 (the butterfly portion 2002 with attached wings 22010, 2020 is supported by the first and second shackles 302, 312 of the pair of adjacent trolleys 202, 212.

The method 1000 further includes, at step 1020, providing a first cutting module 410, positioned adjacent the first section or portion 120 of the second processing section 118 of the shackle conveyor 110. The first cutting module 410 includes a first cutting assembly 415 moving between a retracted position RP and an engaged position EP along a line of action LN1 transverse to the trolley path of travel SPT to engage a poultry carcass portion 2000. The first cutting assembly 415 includes spaced apart first and second cutting members, for example, first and second power driven cutting blades 430, 440 of the first cutting head 420*a*. The first cutting module 410 also includes a cutting head translation assembly or mechanism 414 including, for example, the drive belt arrangement 416 and the linear cam mechanism 450 for moving the first cutting head 420*a* of the first cutting assembly 415 along the trolley path of travel SPT in synchronization with the trolley velocity Vt over a first engagement distance ED1 wherein the first and second cutting members 420, 430 engage the poultry carcass portion 2000, as supported by respective first and second shackles 302, 312 of the pair of adjacent trolleys 202, 212. In one example, embodiment of the method 1000, the first cutting assembly 415 includes the plurality of cutting heads 420 which are driven about the linear closed cam track 452 and each of which include spaced apart first and second power driven cutting blades, the cutting heads of the plurality of cutting heads 420 sequentially engaging the sequence of poultry portions 2000 supported on respective adjacent pairs of shackles of the plurality of shackles 300 of the shackle conveyor 110.

The method 1000 further includes, at step 1030, in the first input section 112 of the shackle conveyor 110, hanging the first and second wings 2010, 2020 of a poultry carcass portion 2000, for example, butterfly portion with attached wings 2002, in a pair of adjacent shackles 302, 312 by hanging the pair of wings 2010, 2020 in respective wing-receiving openings 322, 332 of the first and second shackles 302, 312 of the pair of adjacent trolleys 202, 212 thereby supporting the butterfly 2002 between the pair of adjacent shackles 302, 312 for movement of the pair of wings 2010, 2020 in the flow direction FD along the shackle path of travel SPT.

In one example embodiment of the method 1000, the method further includes, at step 1140, moving or advancing the first cutting head 420*a* of the first cutting assembly 415 of the first cutting module 410 from the retracted position RP to the engaged position EP such that the first and second cutting blades 420, 430 of the first cutting head 420*a* engage the poultry carcass portion 2000 hanging from the first and second shackles 302, 312 in the region of the first cutting assembly 415.

In one example embodiment of the method 1000, at step 1150, the method further includes moving or translating the first cutting head 420*a* of the first cutting assembly 415 of the first cutting module 410 in a path parallel to the shackle/trolley path of travel SPT, while the first cutting head 420*a* remains in the engaged position EP over an engagement distance ED1 such that the first and second cutting blades 430, 440 of the first cutting head 420*a* maintains engagement with and severs the breast portion 2030 from the pair of wings 2010, 2020, the pair of wings 2010, 2020 remaining in the wing-receiving openings 322, 332 of respective first and second shackles 302, 312 of the pair of adjacent trolleys 202, 203. The first cutting blade 420 engages and cuts a region adjacent the wing joint 2012 of the first wing 2010 to sever the first wing 2010 from the breast portion 2030, while the second cutting blade 430 engages and cuts a region adjacent the wing joint 2022 of the second wing 2020 to sever the second wing 2010 from the breast portion 2030. That is, the pair of first and second severed wings 2010, 2020 remain in the wing-receiving openings 322, 332 of respective first and second shackles 302, 312 of the pair of adjacent trolleys 202, 203 and the severed breast portion 2030 is directed away from the shackles 302, 312 where it is collected for further processing and/or packaging.

In one example embodiment of the method 1000, at step 1160, the method further includes moving or retracting the first cutting head 420*a* of the first cutting assembly 415 of the first cutting module 410 from the engaged position EP to the retracted position RP.

Method of Poultry Processing 1100

The present disclosure also relates to a method of processing poultry 1100 utilizing the poultry processing apparatus 100. Like the explanation above with respect to the method 1000, it should be understood that the method 1100 includes the following steps relating to the processing of a single poultry carcass portion 2000, it being understood that the poultry processing apparatus 100 will sequentially process many, many poultry carcass portions during a work shift, as the shackle conveyer 110 will continuously move at the trolley velocity Vt, thus, a given shackle, for example, shackle 302 will continue to circulate around the endless loop of the conveyor trolley track 130 numerous times during the course of a work shift. In an alternate example embodiment of a method of poultry processing of the present disclosure, the poultry processing method 1100 utilizes first and second spaced apart cutting modules 410, 460, the first cutting module 410 including the first cutting assembly 415 and the second cutting module 410 including the second cutting assembly 465. The second cutting module 460 being downstream in the flow direction FD from the first cutting module 410. The first cutting assembly 415 includes the first cutting head 420*a* of the plurality of cutting heads 420. The first cutting head 420*a* includes first and second cutting members, for example, first and second power driven cutting blades 430, 440 of the first cutting head 420*a*. The second cutting assembly 465 includes a plurality of cutting heads 470. The plurality of cutting heads 470 includes a first cutting head 470*a*. The first cutting head 470*a* includes first and second cutting members, for example, first and second power driven cutting blades 480, 490 of the first cutting head 470*a*. In the method 1100, the first cutting module 410 performs a pre-cut or partial cuts around the wing joints 2012, 2022, while the second cutting module 460 performs the final cuts around the wing joints 2012, 2022 thereby severing of the wings 2010, 2020 from the remainder of the poultry carcass 2000 (the butterfly portion 2002) while the wings remain in the respective wing-receiving openings 322, 332 of the pair of shackles 302, 312. That is, the pair of first and second severed wings 2010, 2020 remain in the wing-receiving openings 322, 332 of respective first and second shackles 302, 312 of the pair of adjacent trolleys 202, 203 and the severed breast portion 2030 is directed away from the shackles 302, 312 where it is collected for further processing and/or packaging.

In one example embodiment, the first cutting module 410 is positioned adjacent the shackle conveyor 110 at the first portion 120 of the second processing section 118 of the shackle conveyor 110, while the second cutting module 460 is positioned downstream in the flow direction FD at a second portion 122 of the second processing section 118 of the shackle conveyor 110. First, the first cutting module 410 is advantageously configured such that the first and second blades 420, 430 engage the poultry carcass portion 2000 and make a pre-cut or partial cut around the respective wing joints 2012, 2022 of the first and second wings 2010, 2020 of the poultry carcass portion 2000, as opposed to severing the first and second wings 2010, 2020 from the breast portion 2030, as was the case in the first method 1000. Then, downstream of the first cutting module 410, the second cutting module 460 including first and second cutting members, that is, in one example embodiment, first and second power driven rotary cutting blades 420, 430 power driven rotary cutting blades 420, 430, is advantageously configured to make a final cut around the respective wing joints 2012, 2022 thereby severing the respective wing joints 2012, 2022 of the first and second wings 2010, 2020 from the breast portion 2030. That is, in the second method 1100, the first cutting module 410 partially performs the wing rounding function while the second cutting module 460 completes the process and severs the first and second wings 2010, 2020 from the breast portion 2030.

In one example embodiment, the method of poultry processing 1100 includes the following steps. At step 1110, providing the shackle conveyor 110 including the set of trolleys 200 driven to move at the predetermined, uniform trolley velocity Vt along the trolley track 130. The trolley track 130 includes the trolley ride surface 130 which defines the trolley path of travel SPT. Each trolley, for example, representative trolley 202 of the set of trolleys 200 supporting a shackle, for example, representative shackle 302 of a set of shackles 300, for movement with the trolley 202 along the trolley track 130. Each shackle 302 includes the wing-receiving opening 322 centered about a vertical center line VCL of the shackle 302, the vertical center line VCL passes approximately through a vertex V of the wing-receiving opening 322, as viewed in plan view. The set of trolleys 200 are uniformly spaced along the trolley path of travel SPT such that there is the predetermined distance between vertical center lines VCL of the respective first and second shackles, for example, representative shackles 302, 312, of a pair of adjacent trolleys 202, 212 of the set of trolleys 200. Each shackle of the respective adjacent first and second shackles 302, 312 of the pair of adjacent trolleys 202, 212 receives a poultry wing, for example, respective poultry wings 2010, 2020 of a poultry carcass portion 2000 in the wing-receiving openings 322, 332 to thereby support the poultry carcass portion 2000 for movement along the shackle conveyor 110 in the flow direction FD along the shackle path of travel SPT. That is, the poultry carcass portion 2000 (the butterfly portion 2002 with attached wings 22010, 2020 is supported by the first and second shackles 302, 312 of the pair of adjacent trolleys 202, 212.

The method 1100 further includes, at step 1120, providing a set of cutting modules 400. The set of cutting modules 400 including a first cutting module 410, positioned adjacent the first section or portion 120 of the second processing section 118 of the shackle conveyor 110. The first cutting module 410 includes a first cutting assembly 415 moving between a retracted position RP and an engaged position EP along a line of action LN1 transverse to the trolley path of travel SPT to engage a poultry carcass portion 2000. The first cutting assembly 415 includes spaced apart first and second cutting members, for example, first and second power driven cutting blades 430, 440 of the first cutting head 420*a*. The first cutting module 410 also includes a cutting head translation assembly or mechanism 414 including, for example, the drive belt arrangement 416 and the linear cam mechanism 450 for moving the first cutting head 420*a* of the first cutting assembly 415 along the trolley path of travel SPT in synchronization with the trolley velocity Vt over a first engagement distance ED1 wherein the first and second cutting members 420, 430 engage the poultry carcass portion 2000, as supported by respective first and second shackles 302, 312 of the pair of adjacent trolleys 202, 212. In one example, embodiment of the method 1000, the first cutting assembly 415 includes the plurality of cutting heads 420 which are driven about the linear closed cam track 452 and each of which include spaced apart first and second power driven cutting blades, the cutting heads of the plurality of cutting heads 420 sequentially engaging the sequence of poultry portions 2000 supported on respective adjacent pairs of shackles of the plurality of shackles 300 of the shackle conveyor 110.

The set of cutting modules 400 further including a second cutting module 460, positioned adjacent the second section or portion 122 of the second processing section 118 of the shackle conveyor 110. The second cutting module 460, similar to the first cutting module 410, includes a second cutting assembly 465 moving between a retracted position RP and an engaged position EP along a line of action LN1 transverse to the trolley path of travel SPT to engage a poultry carcass portion 2000. The second cutting assembly 465 includes spaced apart first and second cutting members, for example, first and second power driven cutting blades 480, 490 of the first cutting head 470*a*. The second cutting module 460 also includes a cutting head translation assembly or mechanism 414 including, for example, the drive belt arrangement 416 and the linear cam mechanism 450 for moving the second cutting head 470*a* of the second cutting assembly 465 along the trolley path of travel SPT in synchronization with the trolley velocity Vt over a first engagement distance ED1 wherein the first and second cutting members 480, 490 engage the poultry carcass portion 2000, as supported by respective first and second shackles 302, 312 of the pair of adjacent trolleys 202, 212. In one example, embodiment of the method 1000, the second cutting assembly 465, like the first cutting assembly 415 includes the plurality of cutting heads which are driven about the linear closed cam track 452 and each of which include spaced apart first and second power driven cutting blades, the cutting heads of the plurality of cutting heads sequentially engaging the sequence of poultry portions 2000 supported on respective adjacent pairs of shackles of the plurality of shackles 300 of the shackle conveyor 110.

The method 1100 further includes, at step 1130, in the first input section 112 of the shackle conveyor 110, hanging the first and second wings 2010, 2020 of a poultry carcass portion 2000, for example, butterfly portion with attached wings 2002, in a pair of adjacent shackles 302, 312 by hanging the pair of wings 2010, 2020 in respective wing-receiving openings 322, 332 of the first and second shackles 302, 312 of the pair of adjacent trolleys 202, 212 thereby supporting the butterfly 2002 between the pair of adjacent shackles 302, 312 for movement of the pair of wings 2010, 2020 in the flow direction FD along the shackle path of travel SPT.

In one example embodiment of the method 1100, the method further includes, at step 1140, moving or advancing the first cutting head 420*a* of the first cutting assembly 415 of the first cutting module 410 from the retracted position RP to the engaged position EP such that the first and second cutting blades 420, 430 of the first cutting head 420*a* engage the poultry carcass portion 2000 hanging from the first and second shackles 302, 312 in the region of the first cutting assembly 415.

In one example embodiment of the method 1100, at step 1150, the method further includes moving or translating the first cutting head 420*a* of the first cutting assembly 415 of the first cutting module 410 in a path parallel to the shackle/trolley path of travel SPT, while the first cutting head remains in the engaged position EP over an engagement distance ED1 such that the first and second cutting blades 430, 440 of the first cutting head 420*a* maintains engagement with and severs the breast portion 2030 from the pair of wings 2010, 2020, the pair of wings 2010, 2020 remaining in the wing-receiving openings 322, 332 of respective first and second shackles 302, 312 of the pair of adjacent trolleys 202, 203. The first cutting blade 420 engages and cuts a region adjacent the wing joint 2012 of the first wing 2010, while the second cutting blade 430 engages and cuts a region adjacent the wing joint 2022 of the second wing 2020.

In one example embodiment of the method 1100, at step 1160, the method further includes moving or retracting the first cutting head 420*a* of the first cutting assembly 415 of the first cutting module 410 from the engaged position EP to the retracted position RP.

In one example embodiment of the method 1100, the method further includes, at step 1170, moving or advancing the first cutting head 470*a* of the second cutting assembly 465 of the second cutting module 460 from the retracted position RP to the engaged position EP such that the first and second cutting blades 480, 490 of the first cutting head 470*a* engage the poultry carcass portion 2000 hanging from the first and second shackles 302, 312 in the region of the second cutting assembly 465.

In one example embodiment of the method 1000, at step 1180, the method further includes moving or translating the first cutting head 470*a* of the second cutting assembly 465 of the second cutting module 410 in a path parallel to the shackle/trolley path of travel SPT, while the first cutting head 470*a* remains in the engaged position EP over an engagement distance such that the first and second cutting blades 480, 490 of the first cutting head 420*a* maintains engagement with and severs the breast portion 2030 from the pair of wings 2010, 2020, the pair of wings 2010, 2020 remaining in the wing-receiving openings 322, 332 of respective first and second shackles 302, 312 of the pair of adjacent trolleys 202, 203. The first cutting blade 480 engages and cuts a region adjacent the wing joint 2012 of the first wing 2010 to sever the first wing 2010 from the breast portion 2030, while the second cutting blade 490 engages and cuts a region adjacent the wing joint 2022 of the second wing 2020 to sever the second wing 2010 from the breast portion 2030. That is, the pair of first and second severed wings 2010, 2020 remain in the wing-receiving openings 322, 332 of respective first and second shackles 302, 312 of the pair of adjacent trolleys 202, 203 and the severed breast portion 2030 is directed away from the shackles 302, 312 where it is collected for further processing and/or packaging.

In one example embodiment of the method 1000, at step 1190, the method further includes moving or retracting the first cutting head 470*a* of the second cutting assembly 465 of the second cutting module 460 from the engaged position EP to the retracted position RP.

It should be appreciated, of course, that a sensor S (schematically depicted in FIG. 2 positioned along the shackle conveyor 110 between the first and second cutting modules 410, 460) may be advantageously positioned adjacent the first cutting module 410 to test or determine whether or not the pair of first and second wings 2010, 2020 are completely severed from the breast portion 2030 upon cutting of the wing joints 2012, 2022 of the poultry portion with attached wings 2000 by the first and second blades 420, 430 of the first cutting module 410 during the first, pre-cut cutting operation. If the sensor S indicates that both the first and second wings 2010, 2020 have been severed from the breast portion 2030 and the breast portion 2030 has fallen away from the shackles 302, 312, the sensor S will transmit appropriate signals such that the appropriate or corresponding cutting head of the second cutting module 460 is not actuated. For example, if the first cutting head 470*a* of the second cutting module 460 would have been the cutting head to engage the poultry portion 2030 to perform the final cut operation and the sensor S indicates that the first and second wings 2010, 2020 have already been severed and the breast portion 2030 is no longer attached as a result of the first, pre-cut cutting operation by the first cutting module 410, the first cutting head 470*a* of the second cutting module 460 would not be actuated. That is, there is no benefit to actuating the cutting head 470*a* of the second cutting module 460 to engage the first and second wings 2010, 2020 if the first and second wings 2010, 2020 have already been successfully severed from the breast portion 2030 by the first cutting head 420*a* of the first cutting module 410.

Similarly, a sensor or detector D (schematically depicted in FIG. 2 positioned along the shackle conveyor 110 prior to or upstream of the first cutting module 410) may be advantageously positioned upstream from the first cutting module 410 to sense or determine the presence of a poultry portion with attached wings 2000 supported by a set or pair of adjacent shackles, for example, to sense if a poultry portion 2000 is supported by the pair of shackles 302, 312. If no poultry portion 2000 is sensed or detected, the detector D will transmit appropriate signals such that the appropriate or corresponding cutting head is not actuated. For example, if the first cutting head 420*a* of the first cutting module 410 would have been the cutting head to engage the poultry portion 2030 to perform the first, pre-cut cutting operation on the poultry portion 2000, and the sensor S indicates that no poultry portion 2000 is present on the pair of shackles 302, 312, the first cutting head 420*a* of the first cutting module 410 would not be actuated. Similarly, the first cutting head 470*a* of the second cutting module 460 would not be actuated to perform the second, final cut cutting operation. That is, there is no benefit to actuating the cutting heads 420*a*, 470*a* of the first and second cutting modules 410, 460 to engage the poultry portion 2000 if it is determined that no poultry portion 2000 is present on the pair of shackles 302, 312.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure or invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A poultry processing apparatus for processing a poultry carcass portion including a breast with attached wings, the apparatus comprising:

a) a shackle conveyor including a set of trolleys driven to move at a trolley velocity in a flow direction along a trolley track, the trolley track having a trolley ride surface defining a trolley path of travel, each trolley of the set of trolleys supporting a shackle for movement with the trolley along the trolley track, each shackle having a wing-receiving opening centered about a vertical center line of the shackle, the set of trolleys being uniformly spaced along the trolley path of travel such that for a pair of adjacent trolleys of the set of trolleys there is a predetermined distance between vertical center lines of the respective first and second shackles of the pair of adjacent trolleys, each shackle of the respective first and second shackles of the pair of adjacent trolleys receiving a wing of a poultry carcass portion in the wing-receiving opening of the shackle to thereby support a poultry carcass portion for movement along the shackle conveyor; and b) a first cutting module positioned adjacent a processing section of the shackle conveyor, the first cutting module including a first cutting head translation assembly and a first cutting assembly including a first cutting head having spaced apart first and second cutting members, the first cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity over a first engagement distance.

2. The poultry processing apparatus of claim 1 further including a second cutting module positioned adjacent a section of the shackle conveyor downstream in the flow direction from the first cutting module, the second cutting module including a second cutting head translation assembly and a second cutting assembly including a second cutting head having spaced apart first and second cutting members, the second cutting head translation assembly moving the second cutting head of the second cutting assembly between a retracted position and an engaged position in a first direction transverse to the trolley path of travel to engage a poultry carcass portion supported by the first and second shackles of the pair of adjacent trolleys and, in the engaged position, moving the second cutting head of the second cutting assembly in a second direction along the trolley path of travel in synchronization with the trolley velocity over a second engagement distance.

3. The poultry processing apparatus of claim 1 wherein a twisted portion of the trolley track includes a trolley ride surface portion that is angled with respect to horizontal, as a trolley of the set of trolleys moves along the twisted portion of the trolley track, the orientation of the trolley changing such that a vertical center line of the shackle of the trolley is a pivoted away from vertical.

4. The poultry processing apparatus of claim 1 wherein the first and second cutting members of the first cutting head of the first cutting assembly of the first cutting module include first and second spaced apart power driven rotary knife blades.

5. The poultry processing apparatus of claim 1 wherein the first cutting assembly of the first cutting module includes a plurality of cutting heads, the cutting head translation assembly including a drive belt assembly and a cam assembly, the drive belt assembly driving the plurality of cutting heads around a cam slot of the cam assembly, the cam slot including a blade advancement portion inducing sequential two-directional movement of each cutting heads of the plurality of cutting heads as the cutting heads sequentially pass through the blade advancement portion of the cam slot, for each cutting head, the two-directional movement including: a) movement of the cutting head between the retracted position and the engaged position in the first direction transverse to the trolley path of travel; and b) movement of the cutting head in the second direction along the trolley path of travel in synchronization with the trolley velocity over the first engagement distance.

6. A method of processing a poultry carcass portion including a breast with attached wings, the steps of the method comprising:

a) providing a shackle conveyor including a set of trolleys driven to move at a trolley velocity along a trolley track, the trolley track having a trolley ride surface defining a trolley path of travel, each trolley of the set of trolleys supporting a shackle for movement with the trolley along the trolley track, each shackle having a wing receiving-opening centered about a vertical center line of the shackle, the set of trolleys being uniformly spaced along the trolley path of travel such that there is a predetermined distance between vertical center lines of respective first and second shackles of a pair of adjacent trolleys of the set of trolleys, each shackle of the respective first and second shackles of the pair of adjacent trolleys receiving a wing of a poultry carcass portion in the wing-receiving opening of the shackle to thereby support a poultry carcass portion for movement along the shackle conveyor;

b) providing a first cutting module positioned adjacent a processing section of the shackle conveyor, the first cutting module including a cutting head translation assembly and a first cutting assembly including a first cutting head having spaced apart first and second cutting members, the cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity over a first engagement distance;

c) supporting a poultry carcass portion the wing-receiving openings of respective first and second shackles of the pair of adjacent trolleys; and d) actuating the first cutting module such that the first and second cutting members of the first cutting head engage the poultry carcass portion.

7. The method of claim 6 wherein step d) further includes severing the breast from the wings, the wings remaining in the wing-receiving openings of respective shackles of the pair of respective first and second shackles of the pair of adjacent trolleys.

8. The method of claim 6 wherein the shackle conveyor further includes a second cutting module positioned adjacent a section of the shackle conveyor downstream in the flow direction from the first cutting module, the second cutting module including a second cutting head translation assembly and a second cutting assembly including a second cutting head having spaced apart first and second cutting members, the second cutting head translation assembly moving the second cutting head of the second cutting assembly between a retracted position and an engaged position in a first direction transverse to the trolley path of travel to engage a poultry carcass portion supported by the first and second shackles of the pair of adjacent trolleys and, in the engaged position, moving the second cutting head in a second direction along the trolley path of travel in synchronization with the trolley velocity over a second engagement distance.

9. The method of claim 6 wherein a twisted portion of the trolley track of the shackle conveyor includes a trolley ride surface that is angled with respect to horizontal, as a trolley of the set of trolleys moves along the twisted portion of the trolley track, the orientation of the trolley changing such that vertical center line of the shackle of the trolley is a pivoted away from vertical.

10. The method of claim 6 wherein the first cutting assembly includes a plurality of cutting heads including the first cutting head, the first cutting head translation assembly including a drive belt assembly and a cam assembly, the drive belt assembly driving the plurality of cutting heads around a cam slot of the cam assembly, the cam slot including an blade advancement portion inducing sequential two-directional movement of each cutting heads of the plurality of cutting heads as the cutting heads sequentially pass through the blade advancement portion of the cam slot, for each cutting head, the two-directional movement including: a) movement of the cutting head between the retracted position and the engaged position in the first direction transverse to the trolley path of travel; and b) movement of the cutting head in the second direction along the trolley path of travel in synchronization with the trolley velocity over a first engagement distance.

11. A poultry processing apparatus for processing a poultry carcass portion including a breast with attached wings, the apparatus comprising:

a) a shackle conveyor including a set of trolleys driven to move at a trolley velocity along a trolley track, the trolley track having a trolley ride surface defining a trolley path of travel, each trolley of the set of trolleys supporting a shackle for movement with the trolley along the trolley track, each shackle having a wing-receiving opening centered about a vertical center line of the shackle, the set of trolleys being uniformly spaced along the trolley path of travel such that for a pair of adjacent trolleys of the set of trolleys there is a predetermined distance between vertical center lines of the respective first and second shackles of the pair of adjacent trolleys, each shackle of the respective first and second shackles of the pair of adjacent trolleys receiving a wing of a poultry carcass portion in the wing-receiving opening of the shackle to thereby support a poultry carcass portion for movement along the shackle conveyor; and b) a first cutting module positioned adjacent a processing section of the shackle conveyor, the first cutting module including a first cutting head translation assembly and a first cutting assembly including a first cutting head having spaced apart first and second cutting members, the first cutting head translation assembly moving the first cutting head between a retracted position and an engaged position in a first direction transverse to the trolley path of travel to engage a poultry carcass portion supported by the first and second shackles of the pair of adjacent trolleys.

12. The poultry processing apparatus of claim 11 wherein when the first cutting head is in the engaged position, the first cutting head translation assembly moves the first cutting head in a second direction along the trolley path of travel in synchronization with the trolley velocity over a first engagement distance.

13. The poultry processing apparatus of claim 12 wherein the cutting head translation assembly includes including a drive belt assembly and a cam assembly, the drive belt assembly driving a cam pin of the first cutting head around a cam slot of the cam assembly, the cam slot including a blade advancement portion inducing sequential two-directional movement of the first cutting head as the first cutting head passes through the blade advancement portion of the cam slot, the two-directional movement of the first-cutting head including: a) movement of the first cutting head between the retracted position and the engaged position in the first direction transverse to the trolley path of travel; and b) movement of the cutting head in the second direction along the trolley path of travel in synchronization with the trolley velocity over the first engagement distance.

14. The poultry processing apparatus of claim 11 wherein the shackle conveyor further includes a second cutting module positioned adjacent a section of the shackle conveyor downstream in the flow direction from the first cutting module, the second cutting module including a second cutting head translation assembly and a second cutting assembly including a second cutting head having spaced apart first and second cutting members, the second cutting head translation assembly moving the second cutting head of the second cutting assembly between a retracted position and an engaged position in a first direction transverse to the trolley path of travel to engage a poultry carcass portion supported by the first and second shackles of the pair of adjacent trolleys.

15. The poultry processing apparatus of claim 14 wherein when the second cutting head of the second cutting assembly of the second cutting module is in the engaged position, the cutting head translation assembly moves the second cutting head in a second direction along the trolley path of travel in synchronization with the trolley velocity over a second engagement distance.

16. The poultry processing apparatus of claim 11 wherein the first cutting assembly of the first cutting module includes a plurality of cutting heads, the cutting head translation assembly including a drive belt assembly and a cam assembly, the drive belt assembly driving the plurality of cutting heads around a cam slot of the cam assembly, the cam slot including a blade advancement portion inducing sequential two-directional movement of each cutting heads of the plurality of cutting heads as the cutting heads sequentially pass through the blade advancement portion of the cam slot, for each cutting head, the two directional movement including: a) movement of the cutting head between the retracted position and the engaged position in the first direction transverse to the trolley path of travel; and b) movement of the cutting head in the second direction along the trolley path of travel in synchronization with the trolley velocity over the first engagement distance.

17. A poultry processing apparatus for processing a poultry carcass portion including two attached wings, the apparatus comprising:

a) a shackle conveyor including a set of trolleys driven to move at a trolley velocity in a flow direction along a trolley track, the trolley track having a trolley ride surface defining a trolley path of travel, each trolley of the set of trolleys supporting a shackle for movement with the trolley along the trolley track, each shackle having a wing-receiving opening, the set of trolleys including a pair of adjacent trolleys wherein respective first and second shackles of the pair of adjacent trolleys each receive a wing of a poultry carcass portion in the wing-receiving opening of the shackle to thereby support a poultry carcass portion for movement along the shackle conveyor; and b) a first cutting module positioned adjacent a processing section of the shackle conveyor, the first cutting module including a first cutting head translation assembly and a first cutting assembly including a first cutting head, the first cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity.

18. The poultry processing apparatus of claim 17 wherein the set of trolleys of the shackle conveyor being uniformly spaced along the trolley path of travel such that for a pair of adjacent trolleys of the set of trolleys there is a predetermined distance between vertical center lines of the respective first and second shackles of the pair of adjacent trolleys.

19. The poultry processing apparatus of claim 17 wherein in the engaged position, the first cutting head translation assembly of the first cutting module moves the first cutting head in the second direction along the trolley path of travel in synchronization with the trolley velocity over a first engagement distance.

20. The poultry processing apparatus of claim 17 wherein the first cutting head of the first cutting module includes spaced apart first and second cutting members, the first cutting member comprising a first power driven rotary knife blade and the second cutting member comprising a second power driven rotary knife blade.

21. The poultry processing apparatus of claim 17 further including a second cutting module positioned adjacent a section of the shackle conveyor downstream in the flow direction from the first cutting module, the second cutting module including a second cutting head translation assembly and a second cutting assembly including a second cutting head having spaced apart first and second cutting members, the second cutting head translation assembly moving the second cutting head of the second cutting assembly between a retracted position and an engaged position in a first direction transverse to the trolley path of travel to engage a poultry carcass portion supported by the first and second shackles of the pair of adjacent trolleys and, in the engaged position, moving the second cutting head of the second cutting assembly in a second direction along the trolley path of travel in synchronization with the trolley velocity and wherein, in the engaged position, the second cutting head translation assembly moves the second cutting head in the second direction along the trolley path of travel in synchronization with the trolley velocity over a second engagement distance.

22. A method of processing a poultry carcass portion including a breast with attached wings, the steps of the method comprising:

a) providing a shackle conveyor including a set of trolleys driven to move at a trolley velocity along a trolley track, the trolley track having a trolley ride surface defining a trolley path of travel, each trolley of the set of trolleys supporting a shackle for movement with the trolley along the trolley track, each shackle having a wing-receiving opening, the set of trolleys including a pair of adjacent trolleys wherein respective first and second shackles of the pair of adjacent trolleys each receive a wing of a poultry carcass portion in the wing-receiving opening of the shackle to thereby support a poultry carcass portion for movement along the shackle conveyor;

b) providing a first cutting module positioned adjacent a processing section of the shackle conveyor, the first cutting module including a first cutting head translation assembly and a first cutting assembly including a first cutting head having spaced apart first and second cutting members, the first cutting head translation assembly moving the first cutting head between a retracted position and an engaged position in a first direction transverse to the trolley path of travel to engage a poultry carcass portion supported by the first and second shackles of the pair of adjacent trolleys and, in the engaged position, moving the first cutting head in a second direction along the trolley path of travel in synchronization with the trolley velocity;

c) supporting a poultry carcass portion in the wing-receiving openings of respective first and second shackles of the pair of adjacent trolleys; and d) actuating the first cutting module such that the first and second cutting members of the first cutting head engage the poultry carcass portion.

23. The method of claim 22 wherein the set of trolleys of the shackle conveyor being uniformly spaced along the trolley path of travel.

24. The method of claim 22 wherein in the engaged position, the first cutting head translation assembly of the first cutting module moves the first cutting head in the second direction along the trolley path of travel in synchronization with the trolley velocity over a first engagement distance.

25. The method of claim 22 wherein the first cutting head of the first cutting module includes spaced apart first and second cutting members, the first cutting member comprising a first power driven rotary knife blade and the second cutting member comprising a second power driven rotary knife blade.

26. The method of claim 22 further including a second cutting module positioned adjacent a section of the shackle conveyor downstream in the flow direction from the first cutting module, the second cutting module including a second cutting head translation assembly and a second cutting assembly including a second cutting head having spaced apart first and second cutting members, the second cutting head translation assembly moving the second cutting head of the second cutting assembly between a retracted position and an engaged position in a first direction transverse to the trolley path of travel to engage a poultry carcass portion supported by the first and second shackles of the pair of adjacent trolleys and, in the engaged position, moving the second cutting head of the second cutting assembly in a second direction along the trolley path of travel in synchronization with the trolley velocity.

* * * * *